United States Patent
Oyama et al.

[11] Patent Number: 5,942,319
[45] Date of Patent: Aug. 24, 1999

[54] LIGHT ABSORPTIVE ANTIREFLECTOR

[75] Inventors: Takuji Oyama, Yokohama; Yoshihito Katayama, Funabashi, both of Japan

[73] Assignee: Asahi Glass Company Ltd., Tokyo, Japan

[21] Appl. No.: 08/917,177

[22] Filed: Aug. 25, 1997

Related U.S. Application Data

[62] Division of application No. 08/571,299, Dec. 12, 1995, Pat. No. 5,691,044.

[30] Foreign Application Priority Data

Dec. 13, 1994 [JP] Japan .................................. 6-309116
Sep. 27, 1995 [JP] Japan .................................. 7-249873

[51] Int. Cl.⁶ .................................................. C03C 17/23
[52] U.S. Cl. ........................ 428/216; 313/461; 359/359; 359/580; 359/585; 428/212; 428/412; 428/336; 428/446; 428/469; 428/472; 428/432; 428/698; 428/912; 427/162; 427/163.3; 427/164; 427/166
[58] Field of Search .................................... 428/432, 216, 428/698, 446, 336, 212, 412, 469, 472, 912; 313/461; 359/359, 580, 585; 427/162, 163.3, 164, 166

[56] References Cited

U.S. PATENT DOCUMENTS

| | | | |
|---|---|---|---|
| 2,784,639 | 3/1957 | Keenan et al. | 350/164 |
| 3,761,160 | 9/1973 | Apfel et al. | 350/164 |
| 3,829,197 | 8/1974 | Thelen | 350/164 |
| 3,854,796 | 12/1974 | Thelen | 350/164 |
| 3,885,855 | 5/1975 | Gross | 350/166 |
| 3,922,068 | 11/1975 | Uetsuki | 350/164 |
| 4,387,960 | 6/1983 | Tani | 350/164 |
| 4,535,000 | 8/1985 | Gordon | 427/160 |
| 4,847,157 | 7/1989 | Goodman et al. | 428/446 |
| 5,085,926 | 2/1992 | Iida et al. | 428/426 |
| 5,091,244 | 2/1992 | Biornard | 428/698 |
| 5,216,542 | 6/1993 | Szczyrbowski et al. | |
| 5,407,733 | 4/1995 | Bjornard et al. | |
| 5,514,454 | 5/1996 | Boire et al. | 428/432 |
| 5,670,248 | 9/1997 | Lazarov et al. | 428/701 |
| 5,691,044 | 11/1997 | Oyama et al. | 428/216 |

FOREIGN PATENT DOCUMENTS

| | | |
|---|---|---|
| 39 41 795 | 6/1991 | Germany. |
| 39 42 990 | 6/1991 | Germany. |
| 41 17 257 | 12/1992 | Germany. |
| 41 17 258 | 12/1992 | Germany. |

OTHER PUBLICATIONS

Glastech. Ber., vol. 66, Nr. 6/7, 1993, pp. 175–183, Guenter Beister, et al., "Advanced Layer Systems and Coating Techniques for Large–Area Glass Coatings by Means of High–Rate Sputtering".

*Primary Examiner*—Archene Turner
*Attorney, Agent, or Firm*—Oblon, Spivak McClelland, Maier & Neustadt, P.C.

[57] ABSTRACT

A light absorptive antireflector comprising a substrate, a light absorbing film formed on the substrate and a silica film formed on the light absorbing film, to reduce reflection of incident light from the silica film side, wherein the geometrical film thickness of the light absorbing film is from 5 to 25 nm, and the geometrical film thickness of the silica film is from 70 to 110 nm.

13 Claims, 15 Drawing Sheets

LIGHT ABSORPTIVE ANTIREFLECTOR

This is a Division of application Ser. No. 08/571,299 filed on Dec. 12, 1995, now U.S. Pat. No. 5,691,044.

TECHNICAL FIELD

The present invention relates to a light absorptive antireflector.

BACKGROUND ART

In recent years, along with rapid expansion of computers, it has been desired to reduce reflection on a display surface or to prevent electrification of the surface of CRT (cathode ray tubes) in order to improve the working environment of the terminal operators. Further, recently, it has been demanded to reduce the transmittance of the panel glass in order to improve the contrast, or to shield electromagnetic waves of extremely low frequencies which may adversely affect human bodies.

To respond to such demands, methods have been adopted such that (1) an electroconductive antireflection film is provided on the panel surface, (2) an electroconductive antireflection film is formed on the surface of a face plate of CRT etc., which is then bonded to a panel surface by a resin, and (3) a filter glass having an electroconductive antireflection film formed on each side is disposed in front of a cathode ray tube.

Among them, in the case of methods (2) and (3), it is common to form the antireflection film in a plurality of layers by a vacuum deposition method. A specific example of such a film construction may be the one disclosed in Japanese Unexamined Patent Publication No. 168102/1985. This publication discloses that an antireflection film is formed by a combination of a dielectric film with a low refractive index, a dielectric film with a high refractive index and an electroconductive film with a high refractive index. By coating a multilayer antireflection film having such a film construction on a panel surface, the visible reflectance of the surface can be reduced to 0.3% or less, and the surface resistance can be reduced to 1 k$\Omega$/□ or less. Further, the above-mentioned electromagnetic wave-shielding effect can thereby be imparted.

Further, as a method of increasing the contrast, it has been known that it is effective to use a light absorbing film as a part of its construction. For example, Japanese Unexamined Patent Publication No. 70701/1989 discloses a case wherein a stainless steel film having a film thickness of 4 nm, a titanium oxide film having a film thickness of 29 nm and a silica film having a film thickness of 95 nm were sequentially formed on a glass substrate by a vacuum vapor deposition method. By coating a multilayer absorptive antireflection film of this construction on a panel surface, the visible reflectance of the surface can be reduced to 0.3% or less, and the surface resistance can be reduced to 1 k$\Omega$/□ or less. Further, at the same time, the visible light transmittance can be reduced by a few tens %, whereby a high contrast can be attained.

On the other hand, method (1) include (a) a case wherein a panel is coated first, and then formed into a cathode ray tube, and (b) a case wherein a cathode ray tube is first formed and then surface coating is applied thereto. In either case, a so-called wet method such as spin coating is relied upon presently.

If a so-called dry method such as the above-mentioned vacuum vapor deposition method is used, in the case of (a), there is a problem such that due to the heat treatment in the step for forming a cathode ray tube after film forming, the film properties will be changed, and the desired performance can not be obtained. In the case of (b), it is necessary to set the entire cathode ray tube in a vacuum chamber. Accordingly, there will be restrictions in the volume and weight, and there is a problem that the handling is not easy.

A sputtering method as a typical film forming method of dry system has had a difficulty in high speed stable film formation of $SiO_2$ which is a low refractive index material essential for the construction of an antireflection film. Therefore, in the sputtering method, no technology has been established for an industrial production of an antireflection film with a large area.

However, recently, due to the increasing demand for high levels of properties as mentioned above, the following problems have been pointed out for the surface treatment by a wet method. Namely, (1) in a wet method, control of the film thickness is difficult as compared with a dry method, and there is a difficulty in reproducibility or uniformity, when it comes to a multilayer film construction of at least three layers, which is desired for good antireflection performance, (2) the lower limit of the surface resistance so far attained by the wet method is about $10^3$ k$\Omega$/□, which may be adequate for antistatic purposes, but it is difficult to attain 1 k$\Omega$/□ which is required for shielding electromagnetic waves, and (3) it is difficult to impart absorptivity without impairing the antireflection performance.

On the other hand, the vapor deposition method has, in addition to the above-mentioned problem in the heat stability of the film properties, a problem that the film forming cost is substantially higher than the wet method, and it has been desired to develop an inexpensive film forming method.

Under these circumstances, various attempts have recently been made to develop a method for forming $SiO_2$ stably at a high speed by sputtering. As a result, several methods are now being practically developed. For example, MMRS (metal mode reactive sputtering) as disclosed in U.S. Pat. No. 4,445,997 and C-Mag (cylindrical magnetron) as disclosed in U.S. Pat. No. 4,851,095 may be mentioned.

As a result, an antireflection film by sputtering is about to be realized. However, with respect to the construction of the antireflection film, the construction of a film which has heretofore been formed by vacuum vapor deposition is followed in many cases, and no film construction particularly effective by sputtering has been known.

The following constructions are known as conventional examples of antireflection films.

For example, J. D. Rancourt "Optical Thin Films User's Handbook" (McGRAW-HILL 1987) discloses at page 128 a spectral reflection curve in a case where a light absorbing film with a complex refractive index (n-ik)=2-i2 and a transparent film with n=1.65 are formed in thicknesses of 3 nm and 75.8 nm, respectively, in this order on a substrate with a refractive index of 2.35. However, in this case, presented are theoretical calculated values, and the reflection characteristics are explained as those corresponding to a so-called "V coat", where the reflection becomes 0 only with a single wavelength shown by a transparent double layer film which is a basic construction for antireflection. Thus, they do not represent low reflectance in a wide range wavelength region (such as from 500 to 650 nm).

Further, U.S. Pat. No. 5,091,244 discloses a case where a transition metal nitride film and a transparent film are formed in film thicknesses of from 6 to 9 nm and from 2 to 15 nm, respectively, sequentially from a substrate side, as a construction to reduce the reflection to incident light from the substrate side (i.e. incident light from the side opposite to the film surface side).

When a light absorbing film having a proper optical constant is formed in a thin thickness, the reflectance from the substrate side decrease, as disclosed, for example, in "Thin-Film Optical Filters", H. A. Macleod, MaGraw-Hill Publishing Co., 2nd Ed., pp65–66 (1989).

In the U.S. Patent, $SiO_2$ is laminated in a thin thickness (from 2 to 15 nm).

However, this construction is designed for the purpose of reducing the reflection from the substrate side. In the case of a multilayered film containing a light absorbing film, the reflection is totally different as between the front and rear sides. Therefore, with this construction invented for the purpose of reducing the reflection from the substrate side, the reflectance from the film surface side is about 10% over the entire visible light region, whereby no reflection-reducing effect is obtained.

U.S. Pat. No. 5,091,244 discloses a four layer construction of glass/transition metal nitride/transparent film/transition metal nitride/transparent film, as a construction to reduce the reflection on the film surface side. However, the object is to reduce the visible light transmittance to 50% or less, and this object is attained by adding an another light absorbing layer and making the number of layers at least four layers, whereby there has been a practical problem from the viewpoint of the production cost.

As described in the foregoing, a film construction has not been known wherein a light absorbing film is contained as a constituting element, the film construction is basically a double layer construction, whereby the production cost is low, and it provides low reflectance within a wide range wavelength region to incident light from the film surface side.

DISCLOSURE OF INVENTION

It is an object of the present invention to solve the above-mentioned drawbacks of the prior art and to provide a light absorptive antireflector which simultaneously has a sufficiently low reflection property within a wide range wavelength region, a sufficiently low surface resistance for shielding electromagnetic waves and a proper visible light absorption to secure a high contrast and which is inexpensive and excellent in the productivity.

The present invention provides a light absorptive antireflector comprising a substrate, a light absorbing film formed on the substrate and a silica film formed on the light absorbing film, to reduce reflection of incident light from the silica film side, wherein the geometrical film thickness of the light absorbing film is from 5 to 25 nm, and the geometrical film thickness of the silica film is from 70 to 110 nm (hereinafter referred to as the first aspect of the invention).

The present invention also provides a light absorptive antireflector comprising a substrate, a light absorbing film formed on the substrate, a transparent film having a high refractive index formed on the light absorbing film and a silica film formed on the transparent film, to reduce reflection of incident light from the silica film side, wherein the geometrical film thickness of the light absorbing film is from 15 to 30 nm, the geometrical film thickness of the transparent film having a high refractive index is from 10 to 40 nm, and the geometrical film thickness of the silica film is from 50 to 90 nm (hereinafter referred to as the second aspect of the invention).

Figure 1:
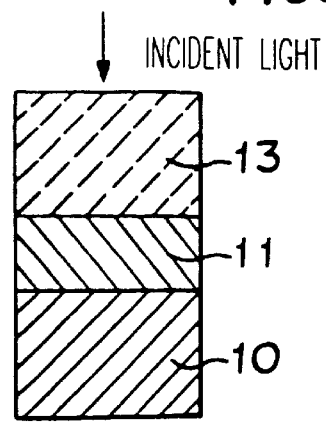
FIG. 1 is a schematic cross-sectional view of one embodiment of the present invention.

In the first aspect of the invention, it is important that the geometrical film thickness (hereinafter, "the geometrical film thickness" will be referred to simply as "the film thickness") of the light absorbing film is from 5 to 25 nm to attain the low reflection, and the film thickness of the silica film is from 70 to 110 nm also from the viewpoint of antireflection. If the film thickness of either layer is outside such a range, no adequate antireflection performance in the visible light region tends to be obtained. Particularly preferred as the film thickness range of the light absorbing film is from 7 to 20 nm, whereby low reflectance can be attained over the entire visible light region. Further, preferred as the film thickness range of the silica film (having preferably a refractive index of 1.46–1.47) is form 80 to 100 nm, whereby the low reflection wavelength range can be adjusted to the center potion of the visible light region.

It is particularly preferable that the film thickness of the silica film is more than 80 nm but not more than 85 nm. If the film thickness of the silica film is not more than 80 nm, the reflectance on the long wavelength side tends to increase, and if the film thickness of the silica film is more than 85 nm, the rising of the reflectance on the short wavelength side tends to be shifted to the long wavelength side.

Further, from the viewpoint of the heat resistance, the film thickness of the light absorbing film in the first aspect of the invention is preferably from 10 to 20 nm. If the film thickness is less than 10 nm, deterioration of the low reflection performance or the surface resistance during the heat treatment tends to be substantial, and if the film thickness exceeds 20 nm, the antireflection region tends to be narrow, although the heat resistance will be improved.

On the other hand, from the viewpoint of the low reflection performance after film formation, the film thickness of the light absorbing film in the first aspect of the invention is preferably from 7 to 15 nm. If the film thickness is less than 7 nm, the reflectance on the long wavelength side tends to remarkably increase, and if the film thickness exceeds 15 nm, the low reflection wavelength region tends to be narrow.

Also, the film thickness of the light absorbing film is more than 8 nm but less than 13 nm, preferably more than 8 nm but not more than 10 nm. If the film thickness of the light absorbing film is not more than 8 nm, the reflectance on the long wavelength side tends to increase, and if the film thickness of the light absorbing film is not less than 13 nm, the rising of the reflectance on the short wavelength side tends to be shifted to the long wavelength side and the rising of the reflectance on the long wavelength side tends to be shifted to the short wavelength side, and accordingly the low reflection wavelength region tends to be narrow.

The light absorptive antireflector according to the first aspect of the invention exhibits excellent antireflection characteristics, but in some cases, deterioration of the characteristics may be observed during the heat treatment step in the process for forming a cathode ray tube, as mentioned above. This change of the characteristics is caused mainly by oxidation of the light absorbing film.

Further, it may happen that after forming the light absorbing film as the first layer, the light absorbing film undergoes oxidation at the time of forming a silica film as the second layer, whereby the desired characteristics can not be obtained.

In such a case, it is possible to prevent oxidation during the film forming or to improve the heat resistance by inserting a layer to prevent oxidation of the light absorbing film (hereinafter referred to as an oxidation barrier layer) between the light absorbing film and the silica film.

An oxidation barrier layer of this type is the one widely used in so-called Low-E glass wherein a silver film is used. For example, U.S. Pat. No. 4,548,691 and Japanese Unexamined Patent Publication No. 165001/1984 teach to form a barrier layer for the purpose of preventing oxidation of a silver layer during the film formation of an oxide film to be formed on the silver film. As such, this barrier layer is a thin film formed to prevent oxidation of another layer formed beneath, and accordingly has no optical significance.

As such an oxidation barrier layer, various metal films or metal nitride films may be employed. The thickness is preferably at most 20 nm not to impair the desired antireflection performance. If the thickness of this oxidation barrier layer is less than 1 nm, improvement of the heat resistance tends to be inadequate. Accordingly, it is preferred to insert an oxidation barrier layer having a thickness of from 1 to 20 nm, whereby the heat resistance can be improved effectively.

As mentioned above, the oxidation barrier layer has no optical significance and is a layer unnecessary from the optical point of view. Accordingly, by the insertion of this layer, the antireflection performance may deteriorate in some cases. Especially in a case where oxidation barrier layer is light absorptive (e.g. light absorptive silicon nitride), the antireflection performance may substantially deteriorate unless the thickness of the oxidation barrier layer is made at most about 5 nm.

When a transparent oxide barrier layer is employed, the allowable film thickness varies depending upon the refractive index of this layer. The allowable film thickness will be largest when a material having a refractive index of about 2.0 (such as transparent silicon nitride or aluminum nitride) is employed. It is possible to insert a barrier layer of up to about 20 nm between the lower nitride layer and the upper silica layer, while maintaining the low reflection characteristics.

As the oxidation barrier layer, it is preferred to employ a film consisting essentially of at least one metal selected from the group consisting of chromium, molybdenum, tungsten, vanadium, niobium, tantalum, zinc, nickel, palladium, platinum, aluminum, indium, tin and silicon, or a film consisting essentially of a nitride thereof, or a film consisting essentially of at least one metal selected from the group consisting of titanium, zirconium and hafnium, whereby adequate improvement of the antioxidation performance and maintenance of excellent antireflection characteristics can be simultaneously be attained.

Especially, a film consisting essentially of silicon or a film consisting essentially of a nitride of silicon is excellent in the oxidation barrier performance. Besides, when the silica film is formed by sputtering from an electroconductive Si target, the target material is not required to be changed, which is advantageous from the viewpoint of the production.

Against the visible light incident from the silica film side, the light absorption of the light absorptive antireflector according to the first aspect of the invention is preferably from 10 to 35%. If the light absorption is outside this range, the film thickness range of the light absorbing film is improper, or the optical constant of the light absorbing film is improper, whereby no adequate antireflection performance in the visible light region tends to be obtained.

As the transparent film having a high refractive index in the second aspect of the present invention, it is preferred to employ a material having a refractive index of at least 1.7. If the refractive index is smaller than 1.7, no substantial improvement in the antireflection performance due to the insertion of the transparent film with a high refractive index will be observed. As a specific material, $Y_2O_3$, $ZrO_2$, $ZnO$, $SnO_2$, $Ta_2O_5$ or $TiO_2$ may, for example, be used.

Further, a transparent conductive film such as ITO may also be used. In this case, the surface resistance will be determined by the parallel resistance of the light absorbing film layer and this transparent electroconductive film layer, whereby reduction of the resistance may be easy as compared with a case where electroconductivity is provided only by the light absorbing film such as titanium nitride.

It is important that the film thickness of the light absorbing film in the second aspect of the invention is from 15 to 30 nm to attain the low reflection, the film thickness of the transparent film having a high refractive index is from 10 to 40 nm, and the film thickness of the silica film is from 50 to 90 nm also from the viewpoint of the antireflection. If the film thickness of either one of these layers is outside such a range, no adequate antireflection performance in the visible light region tends to be obtained.

An oxidation barrier layer may also be provided in the light absorptive antireflector according to the second aspect of the present invention. In the light absorptive antireflector according to the second aspect of the invention, an oxidation barrier layer having a thickness of from 1 to 20 nm may be formed between the light absorbing film and the transparent film having a high refractive index, or between the transparent film having a high refractive index and the silica film.

As the oxidation barrier layer, the same material as preferably used in the light absorptive antireflector according to the first aspect of the invention, can be used preferably.

Against the visible light incident from the silica film side, the light absorption of the light absorptive antireflector according to the second aspect of the invention is preferably from 30 to 60%. If the light absorption is outside this range, the film thickness range of the light absorbing film is improper, or the optical constant of the light absorbing film is improper, whereby no adequate antireflection performance in the visible light region tends to be obtained.

As the substrate in the first and second aspects of the invention, glass or plastics may be used. It is particularly preferred that the substrate is a glass substrate, a plastic substrate or a plastic film, which constitutes the front surface of a display screen, whereby the effects of the present invention can adequately be obtained.

Glass as the substrate to be used for the front surface of a display may, for example, be a panel glass constituting a cathode ray tube itself, a face plate glass to be used as attached to a cathode ray tube by a resin, or a filter glass disposed between a cathode ray tube and an operator. Further, a front glass of a flat display such as a liquid crystal display panel or a plasma display panel, may also be mentioned.

A plastic as the substrate or film to be used for the front surface of a display may, for example, be 1) a transparent film-type plastic such as PET (polyethylene terephthalate) to be used as attached by a resin to the front glass of a cathode ray tube or the above-mentioned flat display, 2) a transparent plastic as a filter substrate disposed between a cathode ray tube and an operator, or 3) a transparent plastic sheet constituting the front surface of a flat display.

Figure 17A:
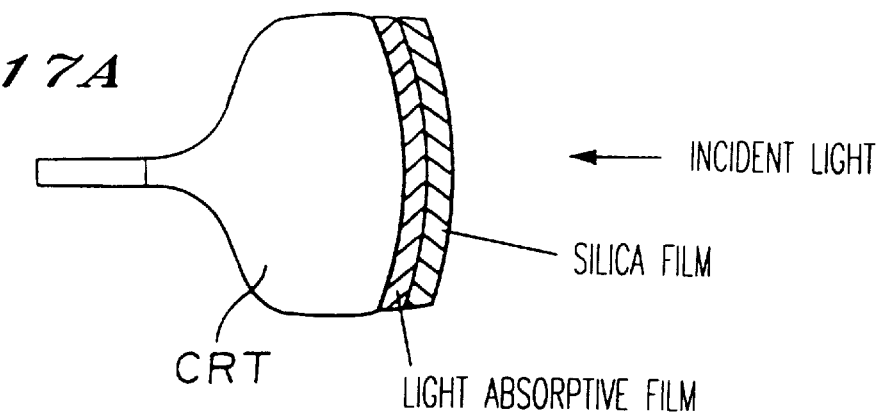
FIG. 17 illustrates various embodiments in which the light absorptive antireflector of the present invention is used.
Figure 17B:
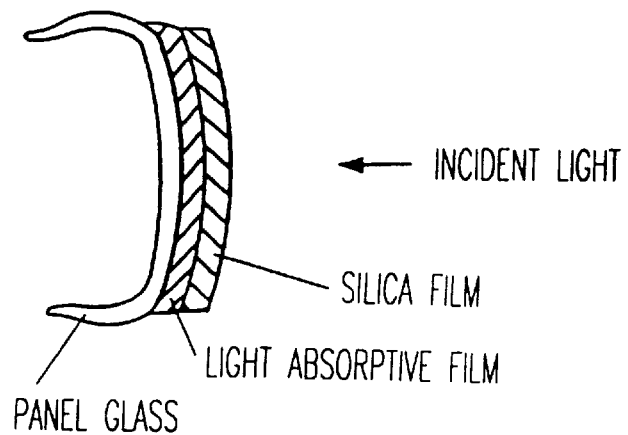
Figure 17C:
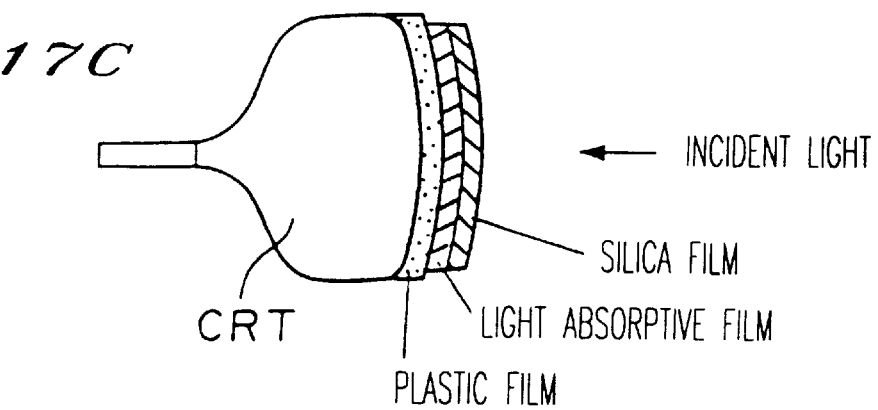

FIG. 17 illustrates various embodiments in which the light absorptive antireflector of the present invention is used.

As shown in FIG. 17, the light absorptive antireflector of the present invention having the antireflection film formed on the substrate surface only on the side of an observer has excellent antireflection characteristics. Further, since the antireflection film is formed directly on the substrate surface generating electromagnetic radiations, the electromagnetic radiations can be quite effectively shielded.

Also, when the light absorptive antireflector is applied to the filter glass, it is preferable to form the antireflection film on the substrate surface also on the opposite side of an observer.

For the light absorbing film in the first and second aspects of the invention, a material is used which is capable of substantially reducing the surface reflectance by the light interference effect with the silica layer formed thereon.

Such a light absorbing film say, for example, be the one consisting essentially of at least one metal selected from the group consisting of titanium, zirconium and hafnium, or the one consisting essentially of nitride of such metal. Among them, it is preferred to employ the one consisting essentially of a nitride of at least one metal selected from the group consisting of titanium, zirconium and hafnium, in view of the dispersion relation of the extinction coefficient and the refractive index in the visible light region, whereby there is a feature that the low reflection region in the visible light range will be broadened by the optical constants thereof.

When two or more materials are employed, 1) they may be used in the form of a composite material, or 2) they may be used in the form of a laminate of a plurality of layers of different materials in a total thickness of from 5 to 25 nm.

Further, a film consisting essentially of a nitride of titanium is particularly preferred, since its optical constants in the visible light region well matches with silica to reduce the reflectance and at the same time the light absorption is proper, and the film thickness to obtain a proper light absorption is within a range of a few nm to a few tens nm. Therefore, this film is particularly preferred from the viewpoint of both the productivity and the reproducibility.

In a case where as the light absorbing film, the one consisting essentially of a nitride of a metal is used, if a film consisting essentially of a nitride is used as the abovementioned oxidation barrier layer, the first layer and the barrier layer can be formed by sputtering in the same gas atmosphere. This is a substantial merit if the actual film forming apparatus by sputtering is taken into account. Namely, when a so-called in-line type sputtering apparatus which is excellent in the mass productivity, is taken into account, such a light absorbing film and an oxidation barrier layer can be formed in the same chamber (chamber A). Therefore, a chamber for gas separation may be provided only between chamber A and a chamber for forming the silica film to be formed thereon, such being extremely efficient.

Especially when a film consisting essentially of titanium nitride is used as the first layer, and silicon nitride is used as the oxidation barrier layer, an additional effect will also be obtained such that the adhesion between the titanium nitride film and the silica film as the outermost layer, is improved. In this case, if both films are formed by an in-line sputtering method in the same chamber, the silicon nitride film as the oxidation barrier layer becomes light absorptive under the sputtering gas condition where suitable titanium nitride is obtainable. Further, the effect for improving the adhesion is likewise obtainable.

As a means for forming the light absorbing film, the transparent film having a high refractive index and the silica film in the first and second aspects of the invention, a common thin film-forming means may be employed. For example, a sputtering method, a vacuum vapor deposition method, a CVD method or a sol-gel method may, for example, be mentioned. Especially, the DC sputtering method is preferred from the viewpoints such that control of the film thickness is relatively easy, practical film strength can be obtained even when the film is formed on a low temperature substrate, a film with a large area can easily be formed, and formation of a laminated film is easy if a so-called in-line type installation is used. Another merit is that control of the film forming conditions is relatively easy so that the nitride of titanium, zirconium or hafnium, which is preferred as the light absorbing film, will have preferred optical constants.

Further, when an in-line type sputtering apparatus is employed, the film thickness distribution in the width direction of transportation can be adjusted to some extent by e.g. the magnetic field intensity distribution of the cathode magnet or by installation of a mask plate. Accordingly, in a case where a substrate is used as the front surface of a display, the film thickness along the periphery of the substrate can be set to be slightly thicker than the central portion. To provide such a film thickness distribution on the substrate is practically preferred, since it is thereby possible to reduce a phenomenon that the reflected color tends to drift to yellow or red by the effect of oblique incidence of light when the periphery of the screen is viewed from the center.

The vacuum vapor deposition method has drawbacks that it is essential to heat the substrate, it is difficult to attain a large surface area, and it is relatively difficult to obtain a satisfactory nitride. However, in the case of a substrate material which is relatively small in size and durable at high temperatures, the vacuum vapor deposition method is advantageous in that as a process, this method has been most completely established.

The CVD method requires a still higher temperature, and it is difficult to attain a large surface area from the viewpoint of the film thickness distribution. However, this is an excellent method to obtain a satisfactory nitride.

The sol-gel method is a wet method as mentioned in the technical background and has been used as a technique for the surface treatment of a cathode ray tube. However, it is relatively difficult to obtain a satisfactory nitride, and the operation will be a batch treatment for every film. However, the installation cost is small, and this method may be advantageous from the viewpoint of the costs for the production of a small quantity of products.

The light absorptive antireflection film of the present invention may be formed by a combination of these methods. For example, the light absorbing film of the first layer may be formed by a sputtering method whereby relatively preferred optical constants can be obtained, and then the transparent film having a high refractive index and/or the silica film may be formed by spin coating as a wet method excellent in the film forming cost. Likewise, the light absorbing film of the first layer may be formed by a CVD method, and then the transparent film having a high refractive index and/or the silica film may be formed by spin coating as a wet method excellent in the film forming cost. In this case, the light absorbing film already formed as the first layer may sometimes be corroded depending upon the spin coating solution, whereby the desired characteristics may not be obtained. For example, in a case where a spin coating liquid comprising 0.1N hydrochloric acid, tetraethoxysilane and ethyl alcohol, is used, it is preferred to form an oxide film or a nitride film having good durability as the protective film of the first layer, prior to the spin coating.

As described above, various methods and their combinations may be used for the formation of the light absorptive antireflection film of the present invention (the fist and second aspects of the invention). However, the present invention is not limited to such specific examples.

As a light absorbing film consisting essentially of a nitride of titanium (hereinafter referred to as a TiN light absorbing film), it is most preferred to employ the one formed by DC sputtering of a metal titanium target in the presence of nitrogen gas, in view of the productivity. Here, in order to bring the optical constants of the TiN light absorbing film to a preferred range, it is preferred that the sputtering gas contains nitrogen and a rare gas as main components, wherein the concentration of the nitrogen is from 3 to 50 vol %, preferably from 5 to 20 vol %. If the concentration of the nitrogen is less than this range, the TiN light absorbing film tends to contain excess titanium, whereby the low reflection wavelength region tends to be narrow. On the other hand, if the concentration of the nitrogen is larger than the range, the TiN light absorbing film tends to contain excessive nitrogen, whereby the low reflection wavelength region tends to be narrow, and the resistivity of the TiN light absorbing film tends to be high, whereby the surface resistance tends to be large.

The electric power applied to the target is preferably at a power density of at least 1 W/cm$^2$, for the purpose of maintaining the film forming speed at a level sufficiently quick for industrial production and maintaining the amount of impurities taken into the TiN film during the film formation to a low level. This is particularly effective to control the amount of oxygen to be taken into the film, as described hereinafter. Further, the electric power applied to the target at that time is preferably at a power density of at most 10 W/m$^2$ in order to obtain a TiN film having proper optical constants and to avoid occurrence of abnormal discharge or dissolution of the cathode or the target by an excess application of the electric power to the target. Namely, if an electric power larger than this is applied, even in an atmosphere of pure $N_2$, the film will be a TiN film rich in Ti, whereby the desired composition can hardly be obtained, and the target and its peripheral parts will be heated, whereby arching or in some cases melting of the heated parts will be likely to occur.

The presence of a small amount of impurities in the composition of the target or the sputtering gas creates no problem so long as it is within a range where the thin film finally formed has substantially the optical constant of titanium nitride. Further, the TiN light absorbing film may be formed by sputtering by using a material consisting essentially of titanium nitride as the target.

As the TiN light absorbing film, the atomic ratio of nitrogen to titanium in the film is preferably from 0.5 to 1.5 from the viewpoint of the optical constants and the resistivity. If the atomic ratio is less than 0.5, the product will be a titanium nitride film containing a slightly excess amount of titanium, whereby the optical constant will be improper, and the antireflection effect tends to be inadequate, although the resistivity can be lowered. On the other hand, if it exceeds 1.5, the product will be a titanium nitride film containing an excess amount of nitrogen, whereby the optical constant changes, and the resistivity increases, and consequently both the reflectance and the surface resistance tend to be unsatisfactory.

Especially from the viewpoint of the antireflection, the atomic ratio of nitrogen to titanium in the film is preferably from 0.75 to 1.30.

On the other hand, it has been found that by the presence of oxygen, adhesion with the substrate as an oxide or with the silica film as the upper layer will be improved. Accordingly, so long as the optical constants of TiN are maintained within a preferred range, in some cases, the presence of oxygen in the. TiN film is preferred.

Further, as a TiN light absorbing film, the atomic ratio of oxygen to titanium in the film is preferably at most 0.5 from the viewpoint of the optical constant and the resistivity. If this ratio is larger than 0.5, the product will be titanium oxide nitride film, whereby the resistivity increases, and the optical constant will be improper, and consequently both the surface resistance and the antireflection effect will be unsatisfactory.

In a case where a TiN film is formed by a usual sputtering method, it is unavoidable that oxygen will be contained in the film due to the residual gas component in the vacuum chamber. The influence of the oxygen in the film over the optical characteristics of a TiN film has not heretofore been well known. Especially, nothing has been known about an influence over the performance as a light absorbing layer in the present invention. The present inventors have conducted extensive studies on the relation between the film forming conditions for TiN and the amount of oxygen in the TiN film and the relation with the performance as a light absorbing layer in the present invention, and as a result, have found that as the TiN light absorbing film in the present invention, the atomic ratio of oxygen to titanium in the film is preferably at most 0.4. If this ratio exceeds 0.4, the dispersion relation of the optical constants of TiN will be shifted from a preferred range, whereby the low reflection characteristics will deteriorate. Further, the product will be an oxy-nitride film, whereby the resistivity will increase, and the surface resistance exceeds 1 k$\Omega$/□ which is required for shielding electromagnetic waves, such being undesirable.

By properly selecting the TIN film-forming method and the film-forming conditions on the basis of the above findings, it is possible to form a TiN film so that the reflectance, when a silica film is formed thereon in an optimum thickness, will not exceed 0.6% in a wide wavelength region covering from 500 to 650 nm, as will be shown by the Examples given hereinafter.

As described in the foregoing, in the present invention, it is possible to obtain a laminate having excellent low reflection characteristics when the optical constants of TiN to be used, is maintained within a certain preferred range.

With respect to the optical constant, a more detailed description will be given as follows.

With a conventional double layer antireflection film employing a transparent film, the reflectance at a designed wavelength can be made completely zero by selecting the refractive index and the film thickness of each layer depending upon the refractive index of the substrate. However, such antireflection conditions will be broken at a wavelength other than the designed wavelength. Namely, on the longer and shorter sides of the designed wavelength, the reflectance sharply increases to form a so-called "V coat", whereby low reflection within a wide wavelength range intended by the present invention can not be attained.

On the other hand, when a light absorbing film is employed as a constituting element, parameters which a single film has, increase from two i.e. (n,d) (n: refractive index, d: geometrical film thickness) of the transparent film to three i.e. (n,k,d) (k: extinction coefficient), and with a light absorbing film, the wavelength dependency (dispersion) of (n,k) is substantial, whereby if a light absorbing film having an ideal wavelength distribution of (n,k) is formed in a predetermined film thickness, it is theoretically possible to make the reflectance completely zero at every wavelength, when combined with a transparent film laminated thereon.

Figure 16A:
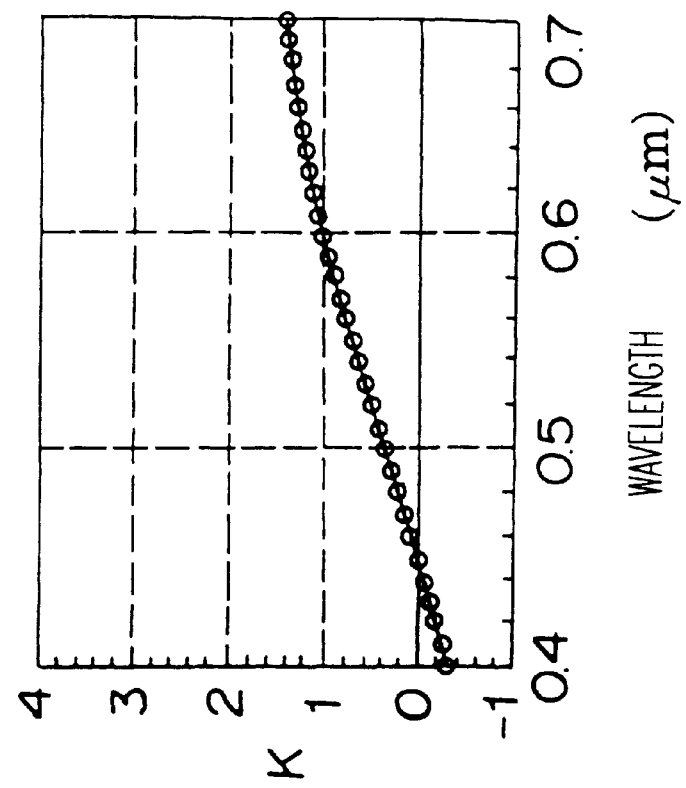
FIG. 16 is a graph showing a distribution relation of the optical constant of an ideal light absorbing film, as obtained by calculation.
Figure 16B:
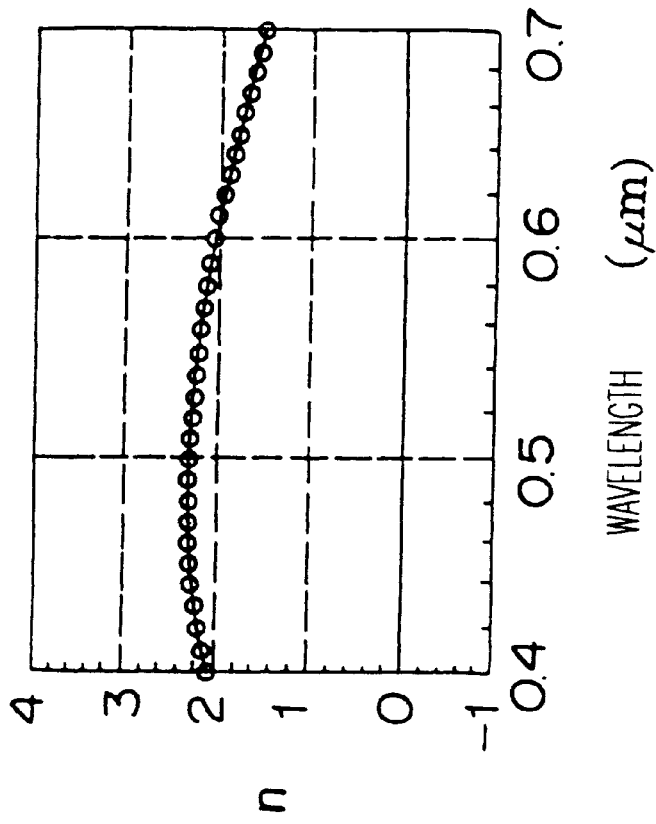

Here, FIG. 16 shows an example of a theoretical calculation conducted by the present inventors, which shows the distribution relation of (n,k) necessary to bring the reflectance zero over the entire visible light region in a case of laminating 15 nm of a light absorbing film as a lower layer and 100 nm of $SiO_2$ as an upper layer. If a material having (n,k) as shown in this Figure is discovered or synthesized, it is possible to realize a completely antireflection film with a double layer structure. However, as is apparent from this Figure, such a material can not be realized, since a wavelength region is present wherein k must have a negative value.

The present inventors have made a search for a material having optical constants close to this ideal (n,k). As a result, it has been found that titanium nitride, zirconium nitride and hafnium nitride are prospective candidates.

Further, the present inventors have conducted various experiments using a sputtering method and as a result, have found it possible to obtain a double layer film construction having excellent low reflection characteristics over a wide wavelength range by selecting certain specific materials, specific film forming conditions or film thicknesses.

As the silica film to be used for the first and second aspects of the invention, it is preferred to employ the one formed by DC sputtering of an electroconductive Si target in the presence of oxygen gas, from the viewpoint of the productivity. Here, to provide electrical conductivity to the target, a small amount of impurities may be mixed. Inclusive of such a case, the silica film here may usually contain a small amount of impurities, and even then, it represents a film having substantially the same refractive index as silica.

In the DC sputtering of Si, arcing is likely to be induced by charge accumulation on an insulating silica film deposited along the periphery of the eroded region of the target, whereby discharge tends to be unstable, and Si or silica particles ejected from the arc spot are likely to deposit on the substrate to form defects. To prevent such phenomena, it is common to employ a method of neutralizing the charge by periodically bringing the cathode to a positive voltage. To use a silica film formed by such a method is particularly preferred also from the viewpoint of the stability of the process. As a method for forming the silica film, RF sputtering may also be employed.

The light absorptive antireflection film of the present invention exhibits excellent antireflection characteristics. However, the reflectance at the center portion of the visible light region is particularly low, and the reflection color tends to be blue to purple. If the film thickness of the silica layer becomes thick, the blue tends to increase. Inversely, if the film thickness of the silica film becomes thin, red tends to increase. Further, as the film thickness of the light absorbing film becomes thick, the color becomes deep. Inversely, if the film thickness of the light absorbing film becomes thin, the color tends to be colorless. Accordingly, the film thickness may be adjusted appropriately depending upon the particular purpose.

In the present invention, an additional thin film layer may be formed, as the case requires, for the purpose of improving the adhesion at the interface or adjusting the color.

Further, an oil repellent organic film containing fluorocarbon may also be formed on the outermost layer in order to facilitate wiping off a finger print on the outermost surface. The forming method may, for example, be a vapor deposition method or a coating and drying method, and in any case, the film is formed to be very thin so that no optical influence will be presented. By applying such treatment, the antireflection film surface will be resistant to soiling, and if soiled, the soil can readily be wiped off.

For the light absorptive antireflection film of the present invention, it is preferred that film forming is carried out by properly adjusting the film forming conditions and the film thicknesses of the respective layers so that the reflectance will not exceed 0.6% in a wide wavelength region of from 500 to 650 nm. It is particularly preferred that each layer is formed so that the reflectance will not exceed 1.0% within a range of from 450 to 650 nm. More preferably, each layer is formed so that the reflectance will not exceed 0.6% within a range of from 450 to 650 nm.

The light absorptive antireflector of the present invention absorbs a part of incident light to reduce the transmittance. Accordingly, when it is applied to the front glass of a display, the intensity of the light ray which enters from the surface and then is reflected by the surface of the display element side, will decrease, whereby the ratio of the display light to this background light is increased to improve the contrast.

In the present invention, the substrate, the light absorbing film, the transparent film having a high refractive index and the silica film are so set that the overall reflectance determined by the Fresnel reflection coefficients at the respective interfaces, the phase differences between the respective interfaces and the amplitude attenuation degrees within the respective layers, will be sufficiently low within the visible light region.

Especially, the optical constants of the light absorbing film show dependency which is different from the dispersion relation (wavelength dependency) of a usual transparent film in the visible light region. Accordingly, by using a light absorbing film material showing a proper dispersion relation as the first layer, the low reflection region in the visible light range can be broadened as compared with the case where the first layer is constituted only by a transparent film. This effect is remarkable when a nitride of at least one metal selected from the group consisting of titanium, zirconium and hafnium, is used as the light absorbing film.

It is not clearly understood why the low reflection characteristics can be realized over a wide wavelength range as shown by the following Examples by the film construction of the present invention. This is, however, believed to be attributable to the fact that the optical constants of the light absorbing thin film are unexpectedly close to the ideal values. The following factors may be mentioned as the causes:

① The film thickness is thin, whereby the film is not really a uniform film, and the optical constants may have a distribution. in the direction of the thickness or in the direction of the plane, and they may approach to more ideal values in equivalence.

② By the specific film forming conditions, a film having the optical constants which have not been known (closer to the ideal) has been obtained.

③ In the process for forming the silica film as the upper layer, the upper portion of the light absorbing film of the lower layer is partially oxidized, whereby the substantial optical constants have changed (to more ideal values).

According to the present invention, it is possible to realize a light absorptive antireflector having excellent low reflection characteristics, which consists essentially of two layers or three layers and which has the above-mentioned effects, by forming TiN having an optical constant within a certain preferred range.

BEST MODE FOR CARRYING OUT THE INVENTION

Now, the present invention will be described in further detail with reference to Examples. However, it should be understood that the present invention is by no means restricted to such specific Examples.

EXAMPLE 1

In a vacuum chamber, metal titanium and N-type silicon (phosphorus doped single crystal) having a resistivity of 1.2 Ω.cm were set as targets on a cathode, and the vacuum chamber was evacuated to $1 \times 10^{-5}$ Torr. A double layer film was formed as follows on a soda lime glass substrate 10 set in the vacuum chamber, to obtain a light absorptive antireflector as shown in FIG. 1.

As a discharge gas, a gas mixture comprising argon and nitrogen (nitrogen being 20 vol %) was introduced, and conductance was adjusted so that the pressure become $2 \times 10^{-3}$ Torr. Then, a negative direct current voltage (input power density was about 2.0 W/cm$^2$) was applied to the titanium cathode, and a titanium nitride film 11 of 14 nm (geometrical film thickness, the same applies to film thickness mentioned hereinafter) was formed by DC sputtering of the titanium target (step 1).

Figure 3:
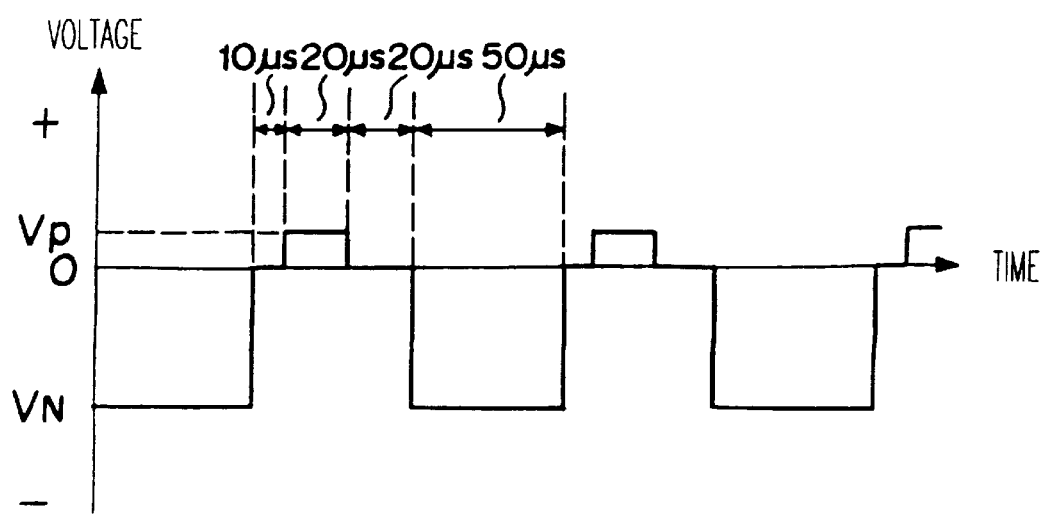
FIG. 3 is a graph showing a change with time of the voltage applied to a silicon target, as used in Examples and Comparative Examples.

Then, introduction of the gas was stopped, and the interior of the vacuum chamber was brought to a high level of vacuum. Then, a gas mixture comprising argon and oxygen (oxygen being 50 vol%) was introduced as a discharge gas, and conductance was adjusted so that the pressure became $2 \times 10^{-3}$ Torr. Then, a voltage with a waveform as shown in FIG. 3 was applied to the silicon cathode, and a silica film 13 having a refractive index of 1.46 of 100 nm was formed by intermittent DC sputtering of the silicon target (step 2).

Figure 4:
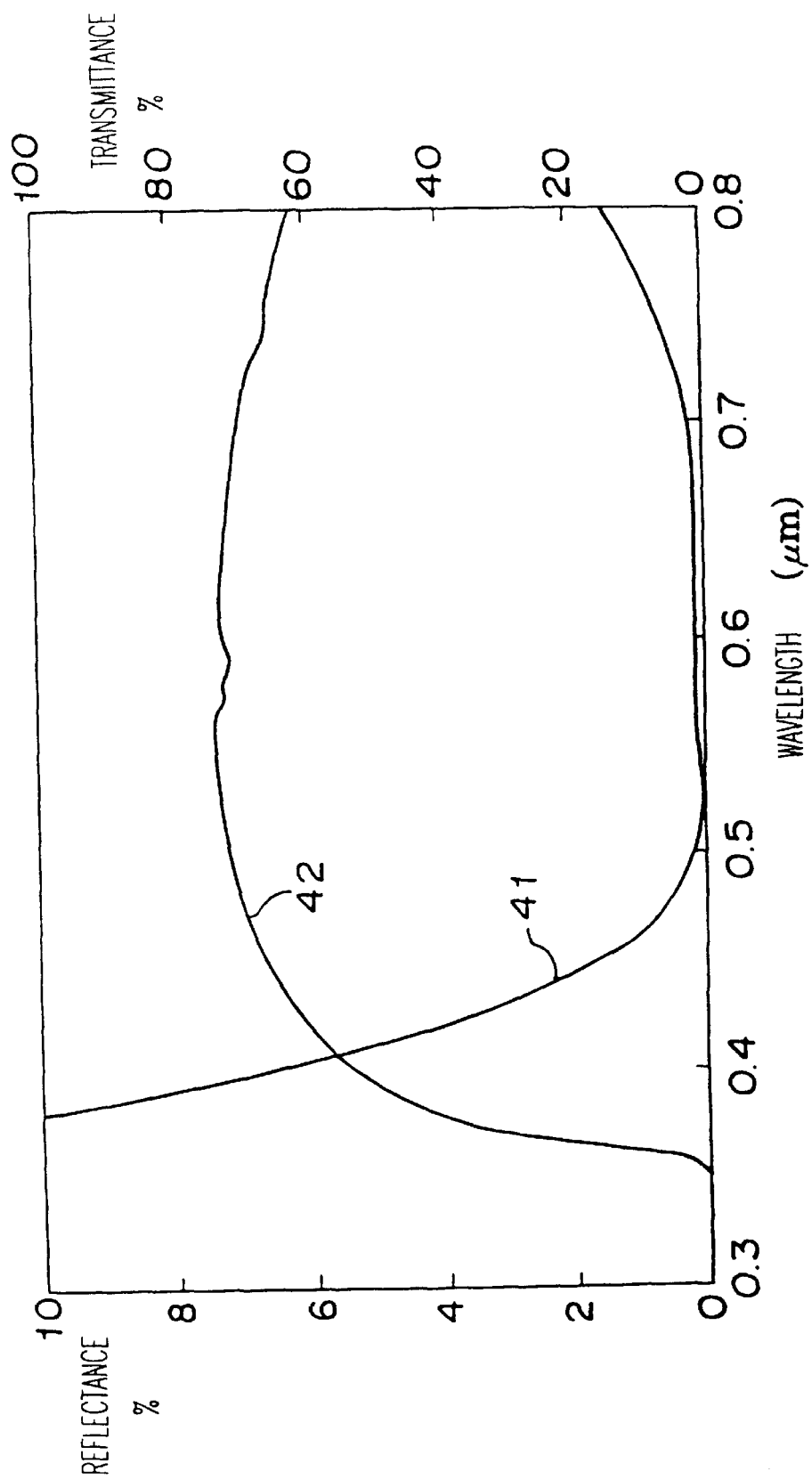
FIG. 4 is a graph showing the spectral reflectance and the spectral transmittance of Example 1.

The spectral transmittance of the obtained light absorptive antireflection glass was measured. Further, the spectral reflectance of this sample was measured from the film surface side in such a state that a black lacquer was coated on the rear side of the glass substrate to eliminate the reflection on the rear side. FIG. 4 shows curve 42 of the spectral transmittance and curve 41 of the spectral reflectance, thus obtained.

Further, after step 1, the titanium nitride film-deposited glass substrate was taken out, and the titanium nitride film was analyzed by ESCA, whereby the atomic ratio was Ti:N:O=1:0.86:0.16.

EXAMPLE 2

Using the same apparatus and targets as used in Example 1, the vacuum chamber was evacuated to $1 \times 10^{-5}$ Torr. A double layer film was formed as follows on a soda lime glass substrate set in the vacuum chamber.

A titanium nitride film of 14 nm was formed in the same manner as in Example 1 except that in step 1 of Example 1, the discharge gas was changed to nitrogen gas (100% nitrogen).

Then, in the same manner as in step 2 of Example 1, a silica film of 100 nm was formed.

After formation of the titanium nitride film, the substrate was taken out in the same manner as in Example 1, and the titanium nitride film was analyzed by ESCA, whereby the atomic ratio was Ti:N:O=1:0.92:0.20.

EXAMPLE 3

Using the same apparatus and targets as used in Example 1, the vacuum chamber was evacuated to $1 \times 10^{-5}$ Torr. A double layer film was formed as follows on a soda lime glass substrate set in the vacuum chamber.

A titanium nitride film of 12 nm was formed in the same manner as in Example 1 except that in step 1 of Example 1, the discharge gas was changed to 10% nitrogen gas.

Then, in the same manner as in step 2 of Example 1, a silica film of 85 nm was formed.

Figure 6:
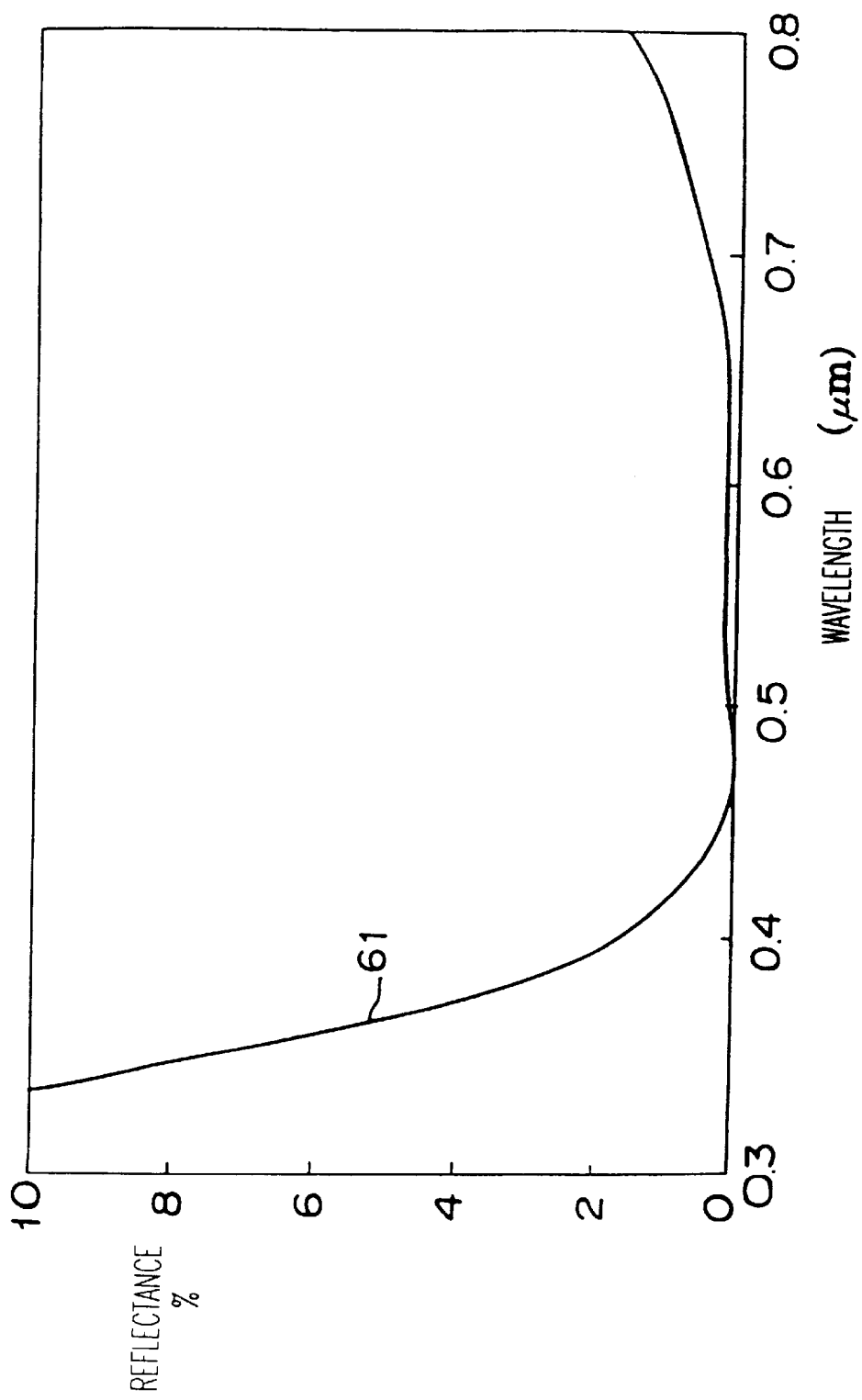
FIG. 6 is a graph showing the spectral reflectance of Example 3.

With respect to the obtained light absorptive antireflection glass, curve 61 of the spectral reflectance was measured in the same manner as in Example 1. The results are shown in FIG. 6.

After formation of the titanium nitride film, the substrate was taken out in the same manner as in Example 1, and the titanium nitride film was analyzed by ESCA, whereby the atomic ratio was Ti:N:O=1:0.95:0.08.

Figure 14:
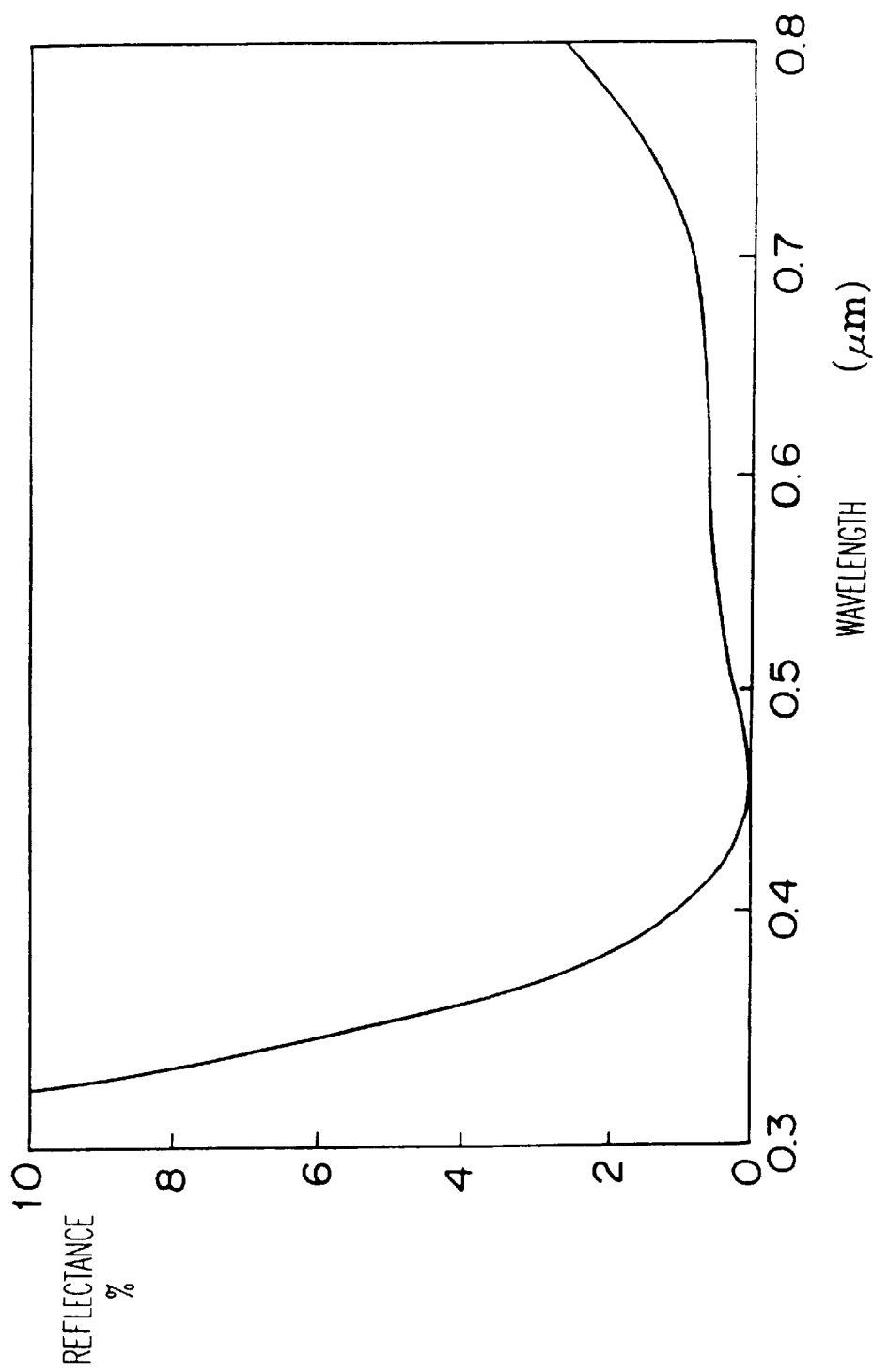
FIG. 14 is a graph showing the spectral reflectance after heat treatment of Example 3.

Further, with respect to the obtained light absorptive antireflection glass, heat treatment at 450° C. for 30 minutes was applied three times, and the curve of the spectral reflectance after the heat treatment is shown in FIG. 14.

EXAMPLE 4

Using the same apparatus and targets as used in Example 1, the vacuum chamber was evacuated to $1 \times 10^{-5}$ Torr. A double layer film was formed as follows on a soda lime glass substrate set in the vacuum chamber.

In the same manner as in Example 3, a titanium nitride film of 7 nm, and a silica film of 85 nm were formed.

Figure 10:
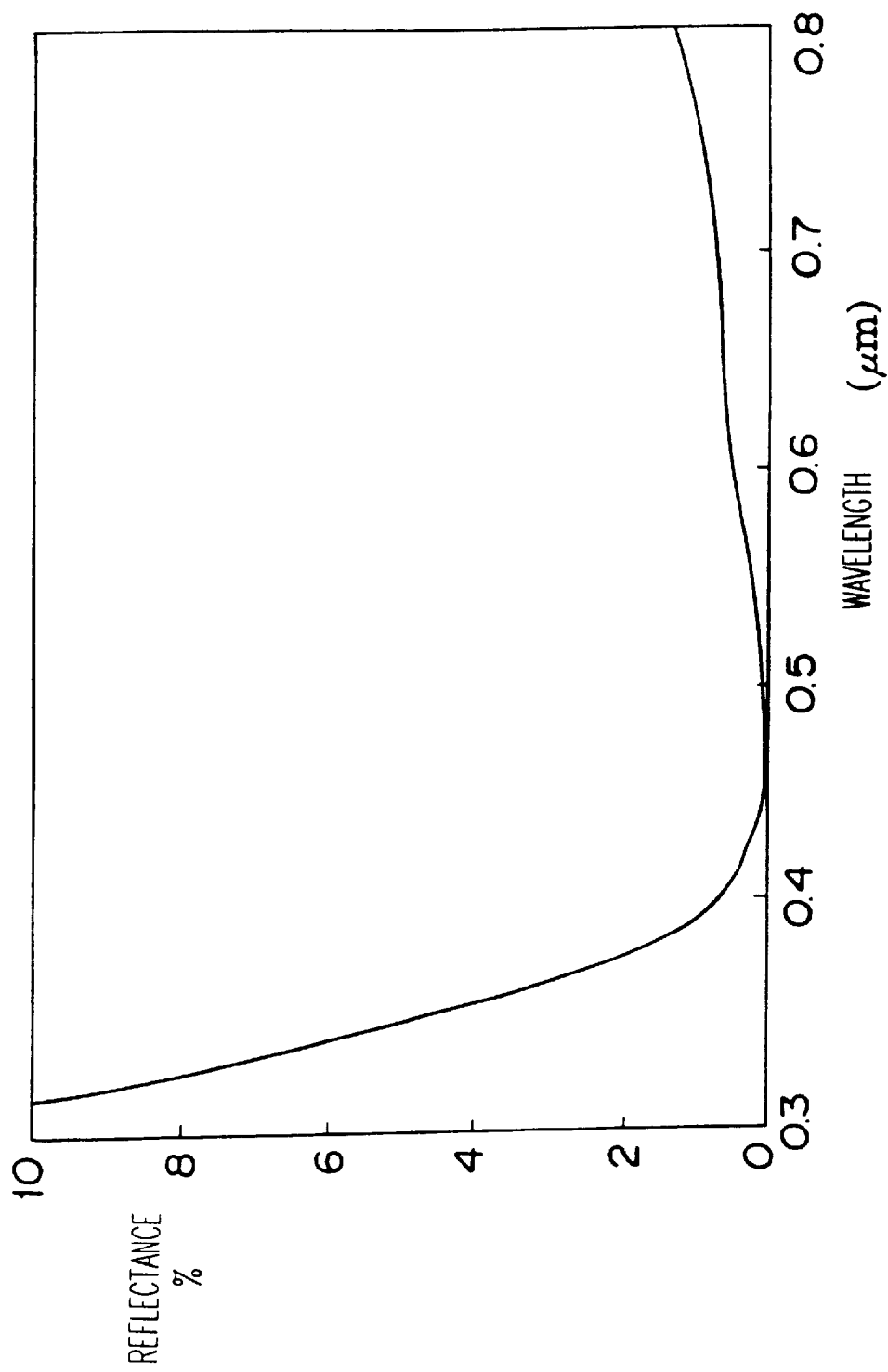
FIG. 10 is a graph showing the spectral reflectance of Example 4.

With respect to the obtained light absorptive antireflection glass, the curve of the spectral reflectance was measured in the same manner as in Example 1. The results are shown in FIG. 10.

After forming the titanium nitride film, the substrate was taken out in the same manner as in Example 1, and the titanium nitride film was analyzed by ESCA, whereby the atomic ratio was Ti:N:O=1:0.95:0.09.

EXAMPLE 5

Using the same apparatus and targets as used in Example 1, the vacuum chamber was evacuated to $1\times10^5$ Torr. A double layer film was formed as follows on a soda lime glass substrate set in the vacuum chamber.

In the same manner as in step 1 of Example 1, a titanium nitride film of 20 nm was formed.

Then, in the same manner as in step 2 of Example 1, a silica film of 100 nm was formed.

Figure 11:
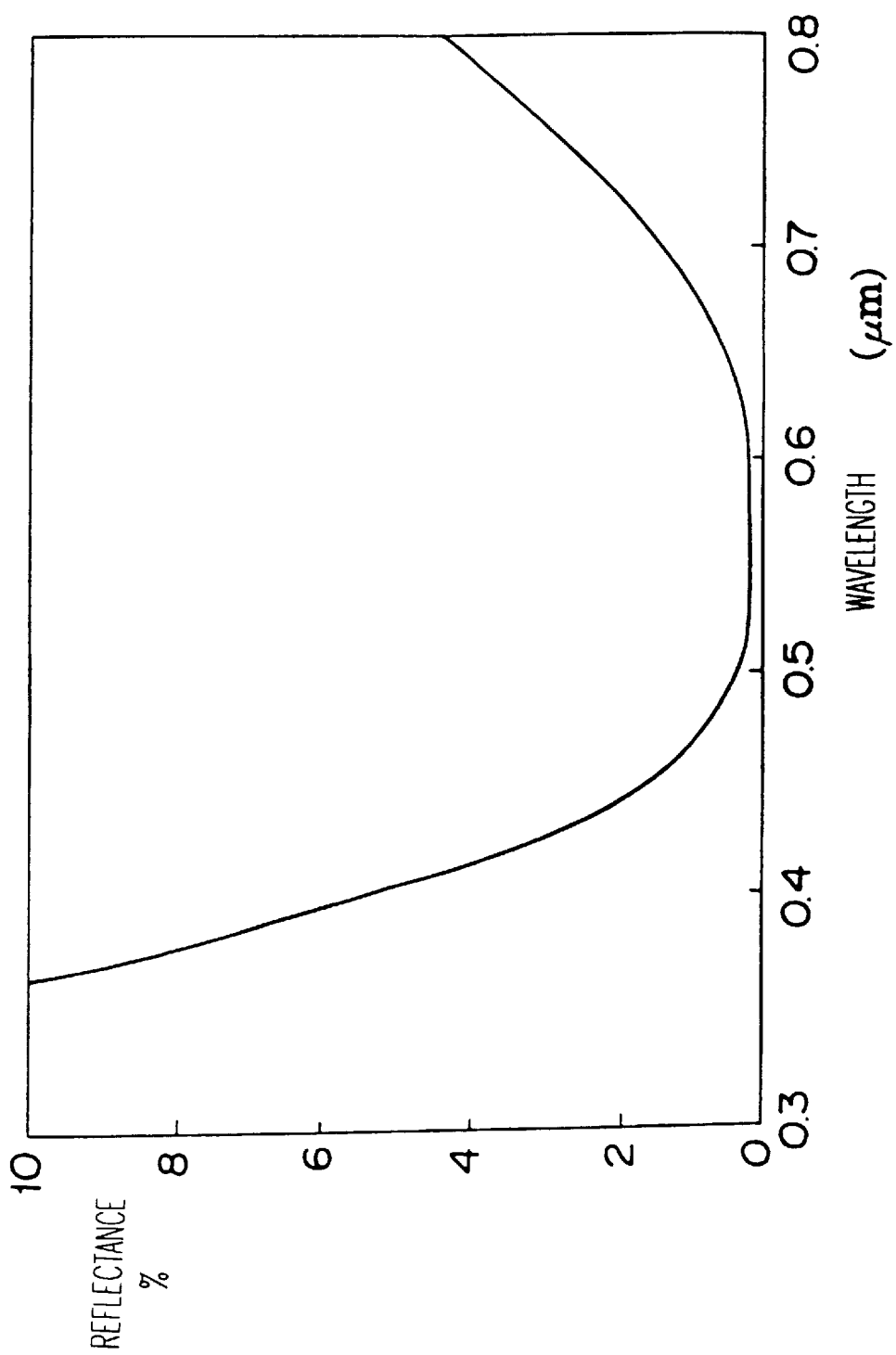
FIG. 11 is a graph showing the spectral reflectance of Example 5.

With respect to the obtained light absorptive antireflection glass, the curve of the spectral reflectance was measured in the same manner as in Example 1. The results are shown in FIG. 11.

After formation of the titanium nitride film, the substrate was taken out in the same manner as in Example 1, and the titanium nitride film was analyzed by ESCA, whereby the atomic ratio was Ti:N:O=1:0.84:0.17.

EXAMPLE 6

Using the same apparatus and targets as used in Example 1, the vacuum chamber was evacuated to $1\times10^{-5}$ Torr. A multilayer film was formed as follows on a soda lime glass substrate set in the vacuum chamber.

In the same manner as in step 1 of Example 1, a titanium nitride film of 14 nm was formed.

Then, the discharge gas was changed to 100% argon, and the pressure was adjusted to $2\times10^{-3}$ Torr. Then, a negative direct current voltage was applied to the silicon cathode, and a silicon film of 2 nm was formed as an oxidation barrier layer by DC sputtering of the silicon target.

Then, in the same manner as in step 2 of Example 1, a silica film of 100 nm was formed.

After formation of the titanium nitride film, the substrate was taken out in the same manner as in Example 1, and the titanium nitride film was analyzed by ESCA, whereby the atomic ratio was Ti:N:O=1:0.88:0.14.

EXAMPLE 7

Using the same apparatus and targets as used in Example 1, the vacuum chamber was evacuated to $1\times10^{-5}$ Torr. A multilayer film was formed as follows on a soda lime glass substrate set in the vacuum chamber.

Firstly, in the same manner as in Example 3, a titanium nitride film of 12 nm was formed. Then, the discharge gas was changed to 30% nitrogen, and the pressure was adjusted to $2\times10^{-3}$ Torr. Then, a negative direct current voltage was applied to the silicon cathode, and a light absorptive silicon nitride film of 5 nm was formed as an oxidation barrier layer by DC sputtering of the silicon target.

Then, in the same manner as in Example 3, a silica film of 85 nm was formed thereon.

After formation of the titanium nitride film, the substrate was taken out in the same manner as in Example 1, and the titanium nitride film was analyzed by ESCA, whereby the atomic ratio was Ti:N:O=1:0.97:0.06.

Figure 15:
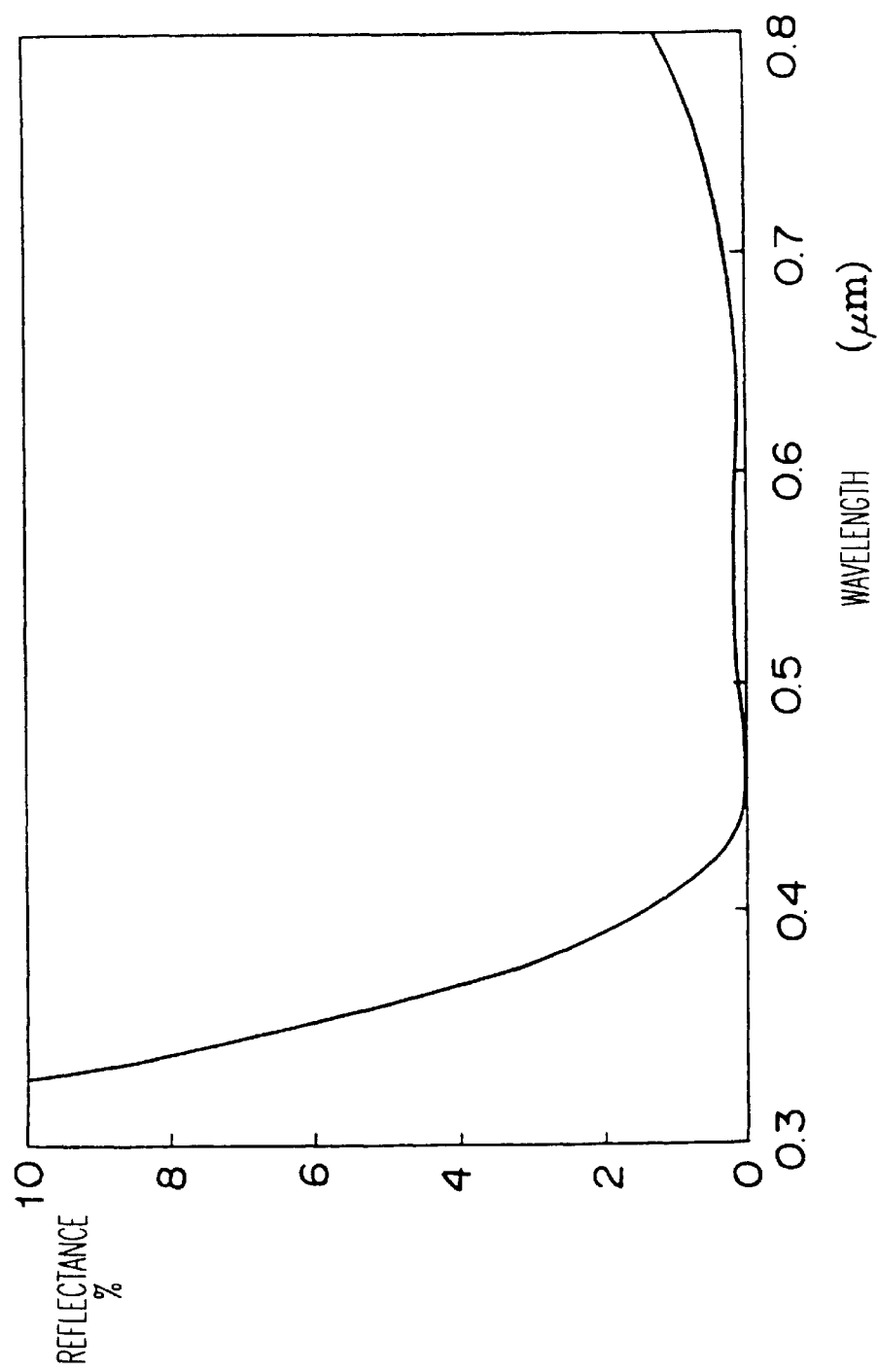
FIG. 15 is a graph showing the spectral reflectance after heat treatment of Example 7.

Further, with respect to the obtained light absorptive antireflection glass, heat treatment at 450° C. for 30 minutes was applied three times, and the curve of the spectral reflectance after the heat treatment is shown in FIG. 15.

EXAMPLE 8

Using the same apparatus and targets as used in Example 1, the vacuum chamber was evacuated to $1\times10^{-5}$ Torr. Oxygen gas introduced as a discharge gas, and the pressure was adjusted to $2\times10^{-3}$ Torr. Then, a negative direct current voltage was applied to the titanium cathode, and a titanium oxide film of 3 nm was formed as an under layer on a soda lime glass substrate set in the vacuum chamber by DC sputtering of the titanium target.

Then, in the same manner as in Example 3, a titanium nitride film of 12 nm and a silica film of 85 nm were formed on the titanium oxide film.

Figure 7:
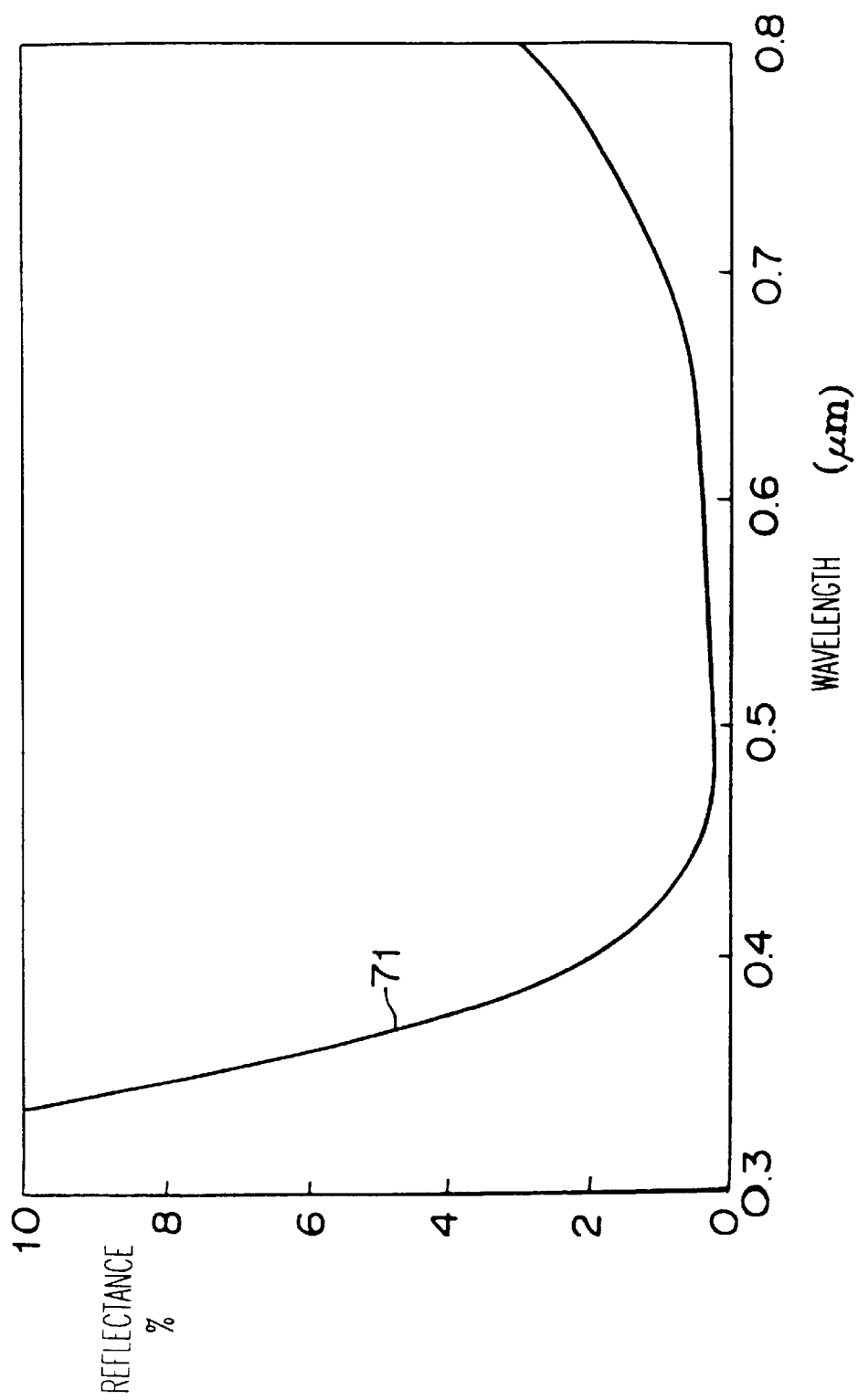
FIG. 7 is a graph showing the spectral reflectance of Example 8.

With respect to the obtained light absorptive antireflection glass, curve 71 of the spectral reflectance was measured in the same manner as in Example 1. The results are shown in FIG. 7.

After formation of the titanium nitride film, the substrate was taken out in the same manner as in Example 1, and the titanium nitride film was analyzed by ESCA, whereby the atomic ratio was Ti:N:O=1:0.93:0.07.

EXAMPLE 9

Using the same apparatus and targets as used in Example 1, the vacuum chamber was evacuated to $1\times10^{-5}$ Torr. A double layer film was formed as follows on a PET substrate (provided with a hard coat, 150 μm thick) set in the vacuum chamber.

In the same manner as in Example 3, a titanium nitride film of 12 nm and a silica film of 85 nm were formed.

Figure 8:
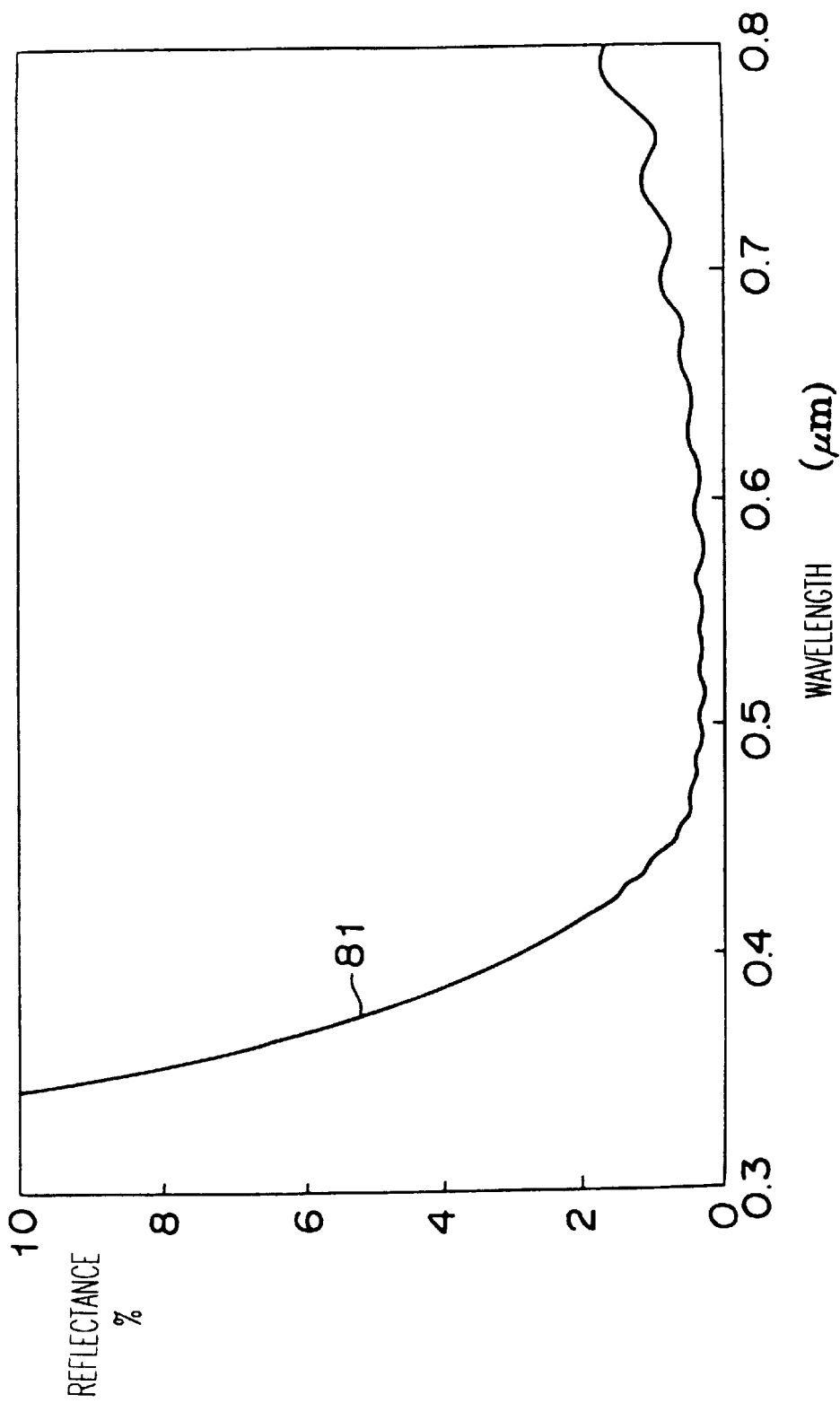
FIG. 8 is a graph showing the spectral reflectance of Example 9.

The obtained PET provided with a light absorptive antireflection film, curve 81 of the spectral reflectance was measured in the same manner as in Example 1. The results are shown in FIG. 8.

After formation of the titanium nitride film, the substrate was taken out in the same manner as in Example 1, and the titanium nitride film was analyzed by ESCA, whereby the atomic ratio was Ti:N:O=1:0.91:0.11.

EXAMPLE 10

Figure 2:
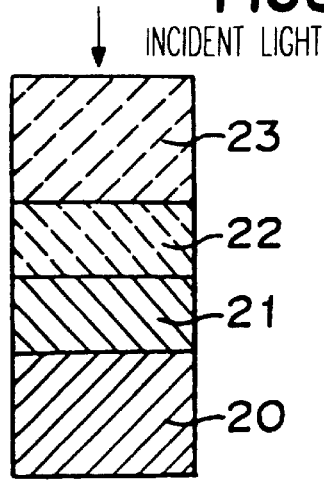
FIG. 2 is a schematic cross-sectional view of another embodiment of the present invention.

Using the same apparatus and targets as used in Example 1, the vacuum chamber was evacuated to $1\times10^{-5}$ Torr. A three layer film was formed as follows on a soda lime glass substrate 20 set in the vacuum chamber to obtain a light absorptive antireflector as shown in FIG. 2.

Using the same gas and pressure as used in step 1 of Example 1, a negative direct current voltage was applied to the titanium cathode, and a titanium nitride film 21 of 30 nm was formed by DC sputtering of the titanium target.

Then, introduction of the gas was stopped, and the vacuum chamber was brought to a high level of vacuum. Then, using the same gas and pressure as used in step 1 of Example 1, a negative direct current voltage was applied to the titanium cathode, and a titanium oxide film 22 of 18 nm (refractive index: about 2.2) was formed by DC sputtering of the titanium target.

Then, while maintaining the introduction of the gas, a voltage of the waveform as shown in FIG. 3 was applied to the silicon cathode, and a silica film 23 of 63 nm was formed by intermittent DC sputtering of the silicon target.

After formation of the titanium nitride film, the substrate was taken out in the same manner as in Example 1, and the titanium nitride film was analyzed by ESCA, whereby the atomic ratio was Ti:N:O=1:0.87:0.14.

EXAMPLE 11

A light absorptive antireflector provided with a three layer film was obtained in the same manner as in Example 10 except that the targets in Example 10 were changed to metal titanium, ITO (tin-doped indium oxide) and N-type silicon (phosphorus-doped single crystal) having a resistivity of 1.2 $\Omega$.cm to form an ITO film (refractive index: about 2.0) instead of the titanium oxide film in Example 10, and the film thicknesses of the titanium nitride film and the silica film were changed.

Namely, in the same manner as in Example 10, firstly a titanium nitride film of 23 nm was formed, and then using an ITO cathode instead of the titanium cathode of Example 10, DC sputtering was carried out in the same manner except that a gas mixture of argon and oxygen (oxygen being 1 vol %) was used as the discharge gas, to form an ITO film of 22 nm. Finally, a silica film of 59 nm was formed.

After formation of the titanium nitride film, the substrate was taken out in the same manner as in Example 1, and the titanium nitride film was analyzed by ESCA, whereby the atomic ratio was Ti:N:O=1:0.86:0.18.

EXAMPLE 12

Using the same apparatus and targets as used in Example 10, the vacuum chamber was evacuated to $1\times10^{-5}$ Torr. Oxygen was introduced as a discharge gas, and the pressure was adjusted to $2\times10^{-3}$ Torr. Then, a negative direct current voltage was applied to the titanium cathode, and a titanium oxide film of 3 nm was formed as an under layer on a soda lime glass substrate set in the vacuum chamber by DC sputtering of the titanium target.

Then, in the same manner as in Example 10, a titanium nitride film of 30 nm, a titanium oxide film of 18 nm and a silica film of 63 nm were sequentially formed on the titanium oxide film of 3 nm.

After formation of the titanium nitride film, the substrate was taken out in the same manner as in Example 1, and the titanium nitride film was analyzed by ESCA, whereby the atomic ratio was Ti:N:O=1:0.85:0.17.

EXAMPLE 13

Using the same apparatus and targets as used in Example 10, the vacuum chamber was evacuated to $1\times10^{-5}$ Torr. A three layer film was formed as follows on a soda lime glass substrate set in the vacuum chamber. Firstly, in the same manner as in Example 10, a titanium nitride film of 30 nm was formed. Then, the discharge gas was changed to 100% of argon, and the pressure was adjusted to $2\times10^{-3}$ Torr. Then, a negative direct current voltage was applied to the silicon cathode, and a silicon film of 3 nm was formed as an oxidation barrier layer by DC sputtering of the silicon target.

Then, in the same manner as in Example 10, a titanium oxide film of 18 nm and a silica film of 63 nm were formed thereon.

After formation of the titanium nitride film, the substrate was taken out in the same manner as in Example 1, and the titanium nitride film was analyzed by ESCA, whereby the atomic ratio was Ti:N:O=1:0.88:0.16.

EXAMPLE 14

Using the same apparatus and targets as used in Example 1, the vacuum chamber was evacuated to $1\times10^{-5}$ Torr. A double layer film comprising 9 nm of a titanium nitride film and 85 nm of a silica film, was formed on a soda lime silica glass substrate set in the vacuum chamber in the same manner as in Example 3.

After formation of the titanium nitride film, the substrate was taken out in the same manner as in Example 1, and the titanium nitride film was analyzed by ESCA, whereby the atomic ratio was Ti:N:O=1:0.94:0.11.

Figure 12:
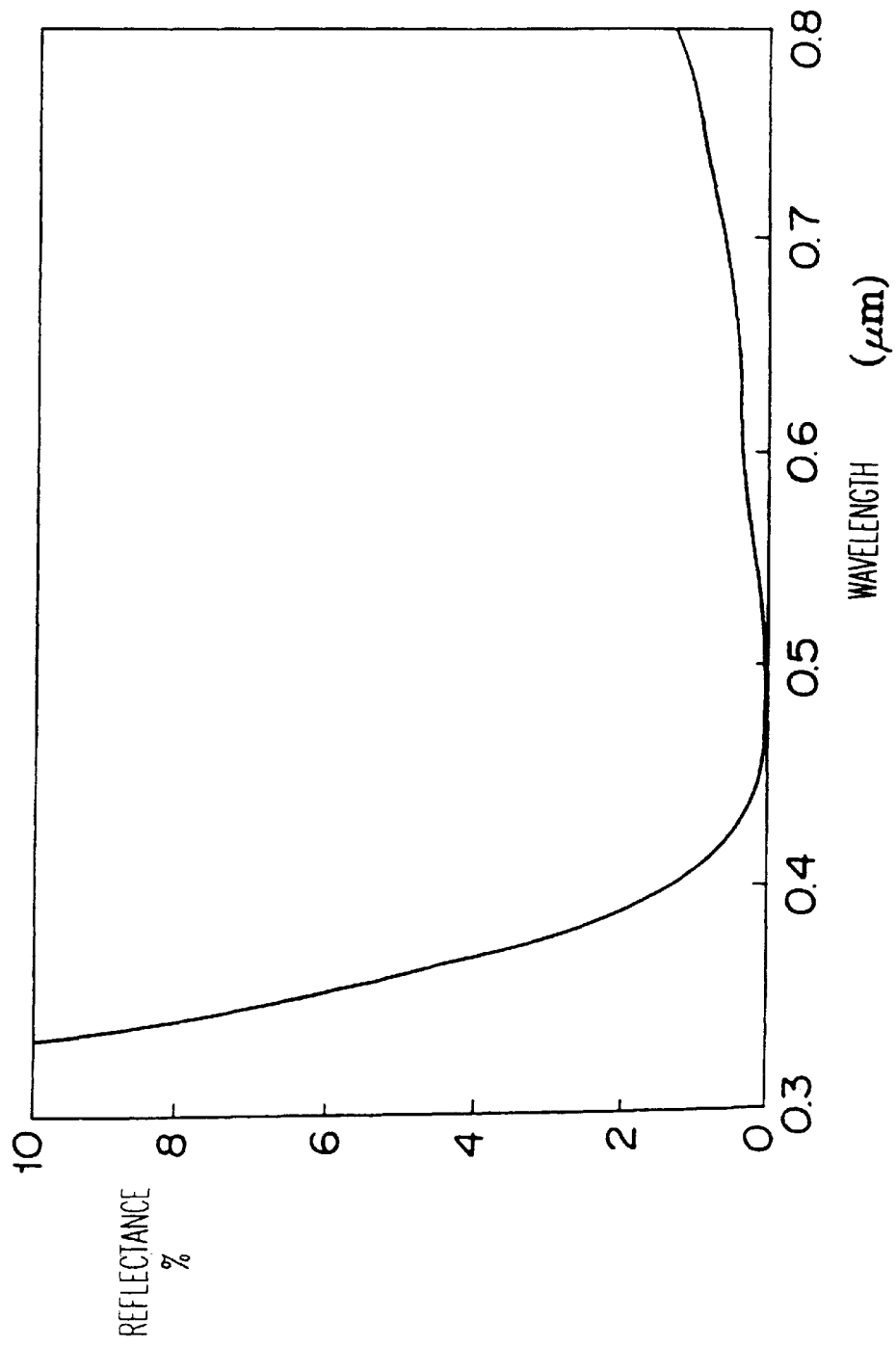
FIG. 12 is a graph showing the spectral reflectance of Example 14.

The spectral reflectance of the obtained sample was measured in the same manner as in Example 1. The results are shown in FIG. 12.

EXAMPLE 15

Using the same apparatus and targets as used in Example 1, the vacuum chamber was evacuated to $1\times10^{-5}$ Torr. A double layer film was formed as follows on a soda lime silica glass substrate set in the vacuum chamber.

Firstly, in the same manner as in Example 3, a titanium nitride film of 12 nm was formed in a 10% nitrogen atmosphere. At that time, the electric power applied to the titanium target was adjusted to ¼ of the power in Example 3. The power density applied here was about 0.5 W/cm². Then, in the same manner as in Example 3, a silica film of 102 nm was formed.

After formation of the titanium nitride film, the substrate was taken out in the same manner as in Example 1, and the titanium nitride film was analyzed by ESCA, whereby the atomic ratio was Ti:N:O=1:0.70:0.65.

Figure 13:
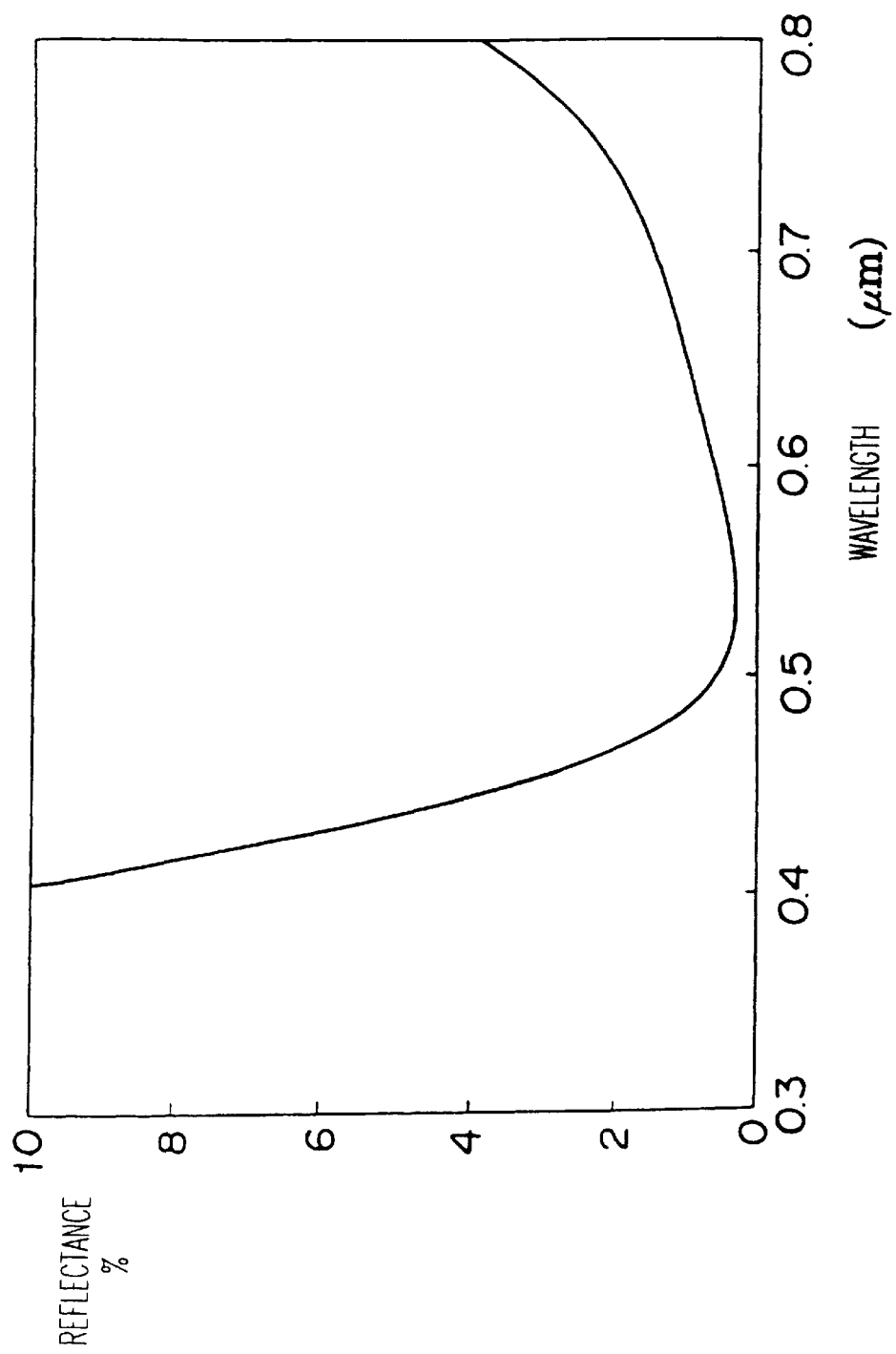
FIG. 13 is a graph showing the spectral reflectance of Example 15.

The spectral reflectance of the obtained sample was measured in the same manner as in Example 1. The results are shown in FIG. 13.

EXAMPLE 16 (COMPARATIVE EXAMPLE)

A double layer film-attached antireflector was prepared in the same manner as in Example 1 except that the targets in Example 1 were changed to ITO (tin-doped indium oxide) and N-type silicon (phosphorus-doped single crystal) having a resistivity of 1.2 $\Omega$.cm to form an ITO film instead of the titanium nitride film in Example 1, and the thickness of the silica film was changed.

Namely, DC sputtering was carried out in the same manner as in Example 1 except that an ITO cathode was used instead of the titanium cathode in Example 1, and a gas mixture of argon and oxygen (oxygen being 1 vol %) was used as a discharge gas, to form an ITO film of 30 nm, and then a silica film of 110 nm was formed in the same manner as in Example 1.

Figure 5:
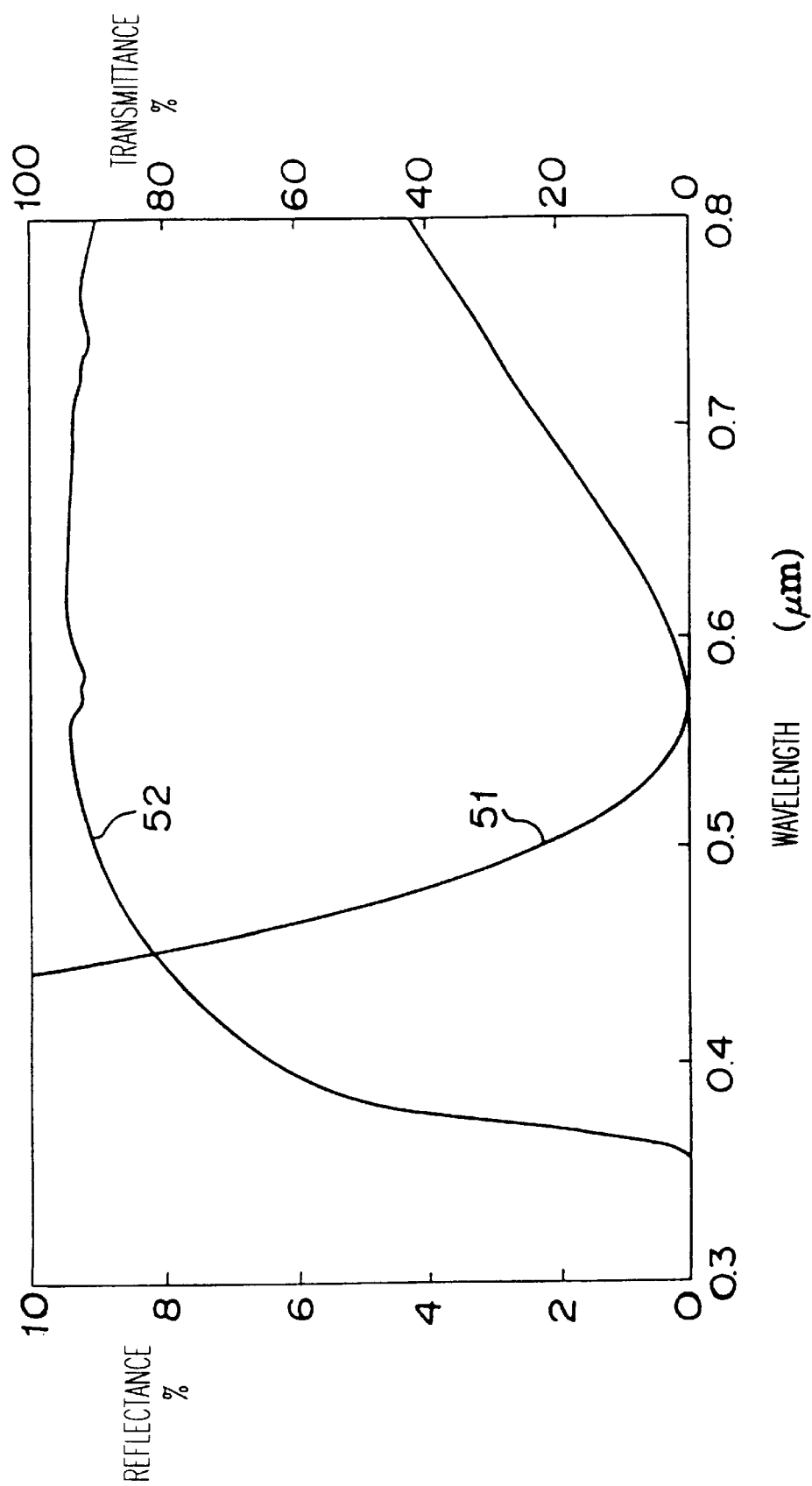
FIG. 5 is a graph showing the spectral reflectance and the spectral transmittance of Example 16.

With respect to the obtained sample, the curve 52 of spectral transmittance and the curve 51 of the spectral reflectance were measured in the same manner as in Example 1. The results are shown in FIG. 5.

EXAMPLE 17 (COMPARATIVE EXAMPLE)

Using the same apparatus and targets as used in Example 1, the vacuum chamber was evacuated to $1\times10^{-5}$ Torr. A double layer film was formed as follows on a soda lime glass substrate set in the vacuum chamber.

In the same manner as in Example 1, a titanium nitride film of 30 nm and a silica film of 100 nm were formed.

Figure 9:
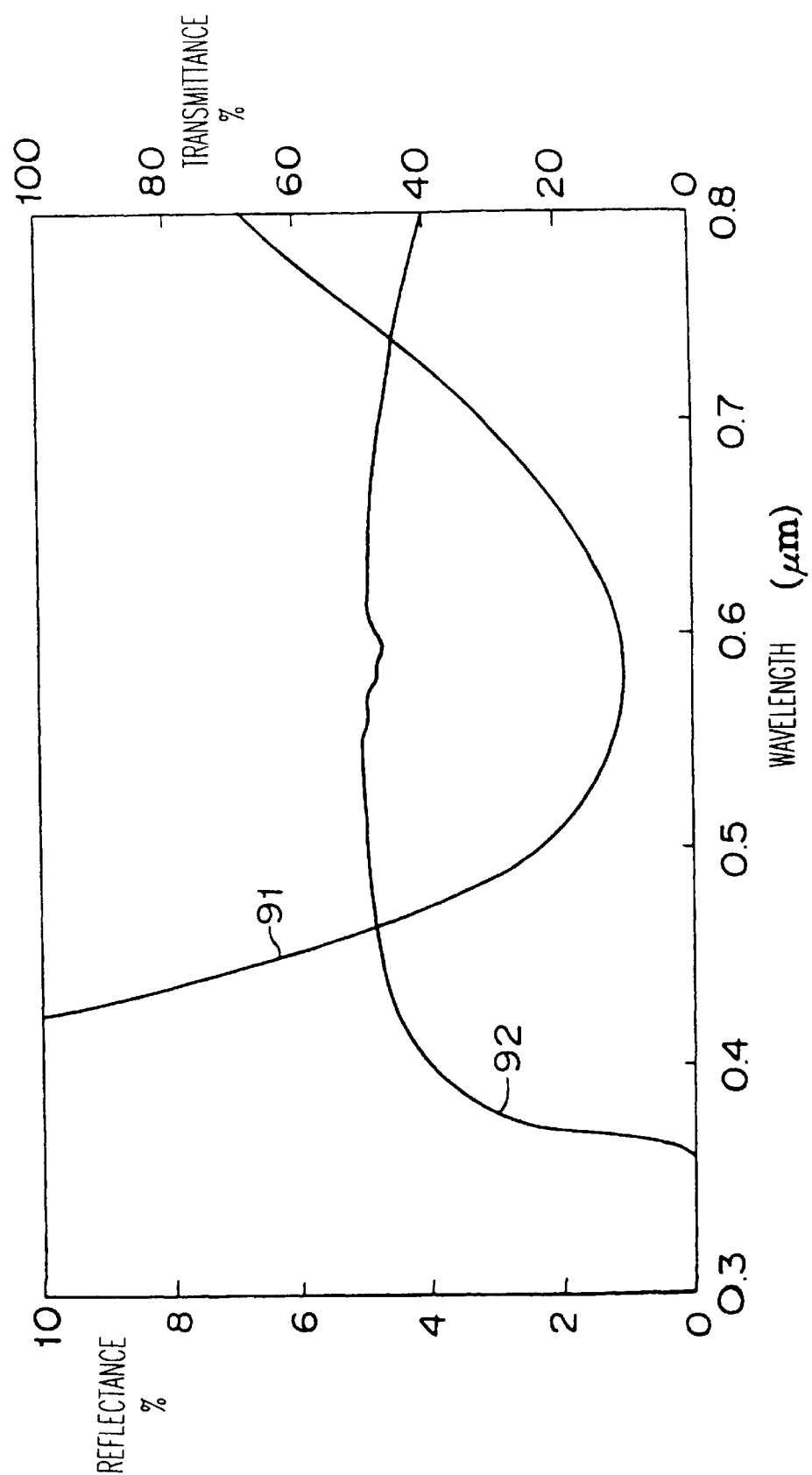
FIG. 9 is a graph showing the spectral reflectance and the spectral transmittance of Example 17.

With respect to the obtained sample, the curve 92 of spectral transmittance and the curve 91 of spectral reflectance were measured in the same manner as in Example 1. The results are shown in FIG. 9.

Further, after formation of the titanium nitride film, the substrate was taken out in the same manner as in Example 1, and the titanium nitride film was analyzed by ESCA, whereby the atomic ratio was Ti:N:O=1:0.87:0.15.

A square sample of 3×3 cm was cut out from each of the antireflection glasses obtained in the above Examples 1 to 17, and electrodes were formed at the four corners of the film surface by glass solder. The surface resistance as measured by a Van der Paun method, the visual reflectance and the visual transmittance obtained from the spectral curve, and the light absorption to incident light from the silica film side (hereinafter refereed to simply as a light absorption) are summarized in Table 1.

To the same light absorptive antireflection glass, heat treatment at 450° C. for 30 minutes was applied three times, whereupon the surface resistance, the visual reflectance, the visual transmittance, the light absorption as measured in the same manner and the wavelength range where the reflectance is at most 0.6%, are shown in Table 1. In Table 1, "before" and "after" mean before the heat treatment and after the heat treatment, respectively.

As is evident from Table 1 and FIGS. 4 to 15, according to the present invention, a light absorptive antireflection glass excellent in heat resistance can be realized with a simple film construction.

When the spectral reflectance curve of Example 1 is compared with Example 16 (Comparative Example) constituted by a transparent film only, it is evident that with the spectral reflectance curve of Example 1, the low reflection region is wide, thus indicating excellent antireflection characteristics.

Further, as is evident from the spectral transmittance curve and the visual transmittance in Table 1, the light absorbing film employed in the present invention is capable of reducing the transmittance as compared with a transparent antireflection film. Accordingly, when the present invention is applied to a panel glass a face plate or a filter glass, set in front of the display screen of e.g. CRT, the effect for improving the contrast of the display screen is remarkable as compared with a transparent antireflection film.

Further, as is evident from these Examples, according to the present invention, the light absorption to incident light from the silica film side of the light absorptive antireflection film of the present invention can be adjusted within a range of from 10 to 35% by selecting the film thickness of the light absorbing film within a preferred range. Of course, as is evident from the graph of the spectral reflectance in Examples, if the thickness of the light absorbing film is increased, the low reflection wavelength region becomes narrow. Accordingly, the film thickness may be selected depending upon the particular purpose.

Further, as is evident from comparison between Examples 1 to 5 and 14, FIG. 4, FIG. 6, FIG. 10 and FIG. 11, and Examples 17 (Comparative Example) and FIG. 9, it is possible to make the antireflection performance excellent by properly selecting the film forming conditions and the film thickness for titanium nitride and the film thickness of the silica film. However if titanium nitride is formed in a thin thickness to improve the antireflection performance, the heat resistance tends to be slightly low, and the property change after the heat treatment tends to be slightly large.

As is evident from Example 5, if the film thickness of titanium nitride is made thick, the change in the properties by heat treatment will be reduced as compared with the case where the film is thin. However, in such a case, the visual reflectance before the heat treatment is as low as 0.12%, but an increase in the reflectance is remarkable at the both ends of the wavelength region of the visible light, and the reflection color is light blue purple.

As is evident from Examples 6 and 7, even if the film thickness of titanium nitride is made thin, the heat resistance can remarkably be improved by forming an oxide barrier layer on the titanium nitride film.

As is evident from Example 8 and FIG. 7, the reflection color can be made close to colorless by inserting a reflection color-adjusting layer in the film construction.

As is evident from Example 9 and FIG. 8, a light absorptive antireflector showing excellent low reflection characteristics can be obtained by the present invention, even when a plastic material is employed as the substrate.

Further, the samples of Examples 1 to 15 were subjected to scratch resistance tests by erasers (load: 500 g, 20 reciprocations) before and after the heat treatment. As a result, any scratch mark which will be practically problematic, was not observed in each case. Especially in Examples 1 to 9, 14 and 15, no scratch mark was observed.

TABLE 1

| Example | Surface resistance (kΩ/□) Before/after | Visual resistance (%) Before/after | Visual transmittance (%) Before/after | Light absorptivity (%) Before/after | Wavelength range (nm) wherein the reflectance is at most 0.6% Before/after |
|---|---|---|---|---|---|
| 1 | 0.63/1.45 | 0.10/0.08 | 69.3/72.1 | 28.4/25.4 | 472–746/467–744 |
| 2 | 2.33/6.52 | 0.18/0.23 | 62.7/66.8 | 35.3/30.9 | 496–677/489–680 |
| 3 | 0.35/1.84 | 0.08/0.38 | 66.3/70.2 | 31.6/27.2 | 428–721/415–601 |
| 4 | 0.87/7.55 | 0.24/1.87 | 75.8/81.0 | 21.3/14.1 | 404–660/412–481 |
| 5 | 0.40/0.85 | 0.12/0.11 | 60.1/63.3 | 38.1/33.8 | 485–654/471–655 |
| 6 | 0.61/0.71 | 0.11/0.10 | 66.2/69.1 | 31.7/28.6 | 475–736/461–738 |
| 7 | 0.39/0.33 | 0.10/0.11 | 68.7/70.6 | 29.0/27.0 | 427–719/420–744 |
| 8 | 0.35/1.69 | 0.35/0.39 | 65.9/70.3 | 31.8/27.1 | 438–667/435–661 |
| 9 | 0.87/— | 0.33/— | 65.4/— | 32.3/— | 455–681/— |
| 10 | 0.25/0.66 | 0.12/0.09 | 49.6/52.3 | 49.2/46.4 | 422–734/418–745 |
| 11 | 0.18/0.23 | 0.15/0.12 | 58.5/61.7 | 39.8/36.4 | 416–723/419–732 |
| 12 | 0.26/0.71 | 0.37/0.33 | 48.9/53.0 | 49.6/45.4 | 424–709/417–713 |
| 13 | 0.23/0.31 | 0.14/0.12 | 45.4/48.5 | 53.5/50.3 | 418–717/414–715 |
| 14 | 0.65/4.81 | 0.15/0.64 | 71.3/75.6 | 26.3/21.2 | 419–693/412–689 |
| 15 | 1.12/8.71 | 0.74/1.84 | 71.9/76.9 | 25.0/18.6 | 501–595/— |
| 16 | 0.22/0.47 | 0.82/0.57 | 94.7/95.0 | 0.4/0.3 | 532–625/514–612 |
| 17 | 0.22/0.29 | 1.22–1.13 | 48.7/50.9 | 49.0/46.8 | —/— |

The multilayer film to be used for the light absorptive antireflector of the present invention, has a proper light absorption and antireflection performance, and can be realized in a simple film construction and without increasing the total film thickness.

Further, by reducing the transmittance, it is possible to increase the contrast. With a surface resistance being at most 1 kΩ/□, it is possible to obtain a light absorptive antireflector having an electromagnetic wave-shielding effect.

Further, the present invention takes substantially a double layer or three layer construction, whereby as compared with a conventional antireflection film having a multilayer construction, the number of interfaces is small, and it is excellent in the heat resistance and the mechanical strength such as scratch resistance. This is remarkable especially in the case of a double layer construction according to the first aspect of the invention.

Further, when DC sputtering is used for a film forming method in the present invention, there will be a merit in that the stability of the process is assured, and a film with a large area can readily be formed. In addition to such features, a light absorptive antireflector can be produced at a low cost.

Further, the light absorptive antireflector according to the present invention, is excellent in the heat resistance and sufficiently durable against heat treatment at a level required for the panel glass of a cathode ray tube. Such a construction is expected to be useful for other applications where the heat resistance is required.

What is claimed is:

1. A light absorptive antireflector comprising a substrate, a single light absorbing film, wherein the light absorbing film is formed on the substrate, and a silica film formed on the light absorbing film, to reduce reflection of incident light from the silica film side, wherein the light absorbing film is a film consisting essentially of a nitride of titanium, and the film consisting essentially of a nitride of titanium, is a film containing oxygen in an amount of from about 0.06 to at most 0.5 as an atomic ratio to titanium, wherein the geometrical film thickness of the light absorbing film is from 5 to 25 nm, and the geometrical film thickness of the silica film is from 70 to 110 nm.

2. The light absorptive antireflector according to claim 1, wherein the geometrical film thickness of the light absorbing film is from 7 to 20 nm.

3. The light absorptive antireflector according to claim 1, wherein the geometrical film thickness of the light absorbing film is from 10 to 20 nm.

4. The light absorptive antireflector according to claim 1, wherein the geometrical film thickness of the light absorbing film is from 7 to 15 nm.

5. The light absorptive antireflector according to claim 1, wherein the geometrical film thickness of the silica film is from 80 to 100 nm.

6. The light absorptive antireflector according to claim 1, wherein the light absorption of the light absorptive antireflector is from 10 to 35% to the incident light from the silica film side.

7. The light absorptive antireflector according to claim 1, wherein the reflectance of the light absorptive antireflector to the incident light from the silica film side does not exceed 0.6% in a wavelength region of from 500 to 650 nm.

8. The light absorptive antireflector according to claim 1, wherein a layer consisting essentially of a metal or metal nitride and having a geometrical film thickness of from 1 to 20 nm, is formed between the light absorbing film and the silica film.

9. The light absorptive antireflector according to claim 8, wherein the layer consisting essentially of the metal or metal nitride, is a layer consisting essentially of silicon or silicon nitride.

10. The light absorptive antireflector according to claim 1, wherein the substrate is a glass substrate, a plastic substrate or a plastic film, which constitutes the front surface of a display screen.

11. The light absorptive antireflector according to claim 1, wherein the substrate is a panel glass, constituting a cathode ray tube.

12. The light absorptive antireflector according to claim 1, wherein the reflectance of the light absorptive antireflector to the incident light from the silica film side after heating does not exceed 0.6% in a wavelength region of from 500 to 650 nm.

13. A method of producing a cathode ray tube with a light absorptive antireflector, comprising forming a light absorbing film on a panel glass for a cathode ray tube, forming a silica film on the light absorbing film, and heating the panel glass to obtain a cathode ray tube, wherein the light absorbing film is a film consisting essentially of a nitride of titanium, and the film consisting essentially of a nitride of titanium, is a film containing oxygen in an amount of at most 0.5 as an atomic ratio to titanium.

* * * * *